United States Patent
Hori et al.

(10) Patent No.: US 11,347,034 B2
(45) Date of Patent: May 31, 2022

(54) ZOOM LENS AND IMAGE PICKUP APPARATUS

(71) Applicant: CANON KABUSHIKI KAISHA, Tokyo (JP)

(72) Inventors: Masao Hori, Utsunomiya (JP); Kazuya Shimomura, Utsunomiya (JP); Naotoshi Ogawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 395 days.

(21) Appl. No.: 16/278,893

(22) Filed: Feb. 19, 2019

(65) Prior Publication Data

US 2019/0265447 A1 Aug. 29, 2019

(30) Foreign Application Priority Data

Feb. 28, 2018 (JP) .............................. JP2018-034961

(51) Int. Cl.
    *G02B 15/16* (2006.01)
    *G02B 13/02* (2006.01)

(52) U.S. Cl.
    CPC ............. *G02B 15/16* (2013.01); *G02B 13/02* (2013.01)

(58) Field of Classification Search
    CPC .. G02B 15/16; G02B 15/144; G02B 15/1441; G02B 15/144109; G02B 15/144113; G02B 15/145113; G02B 15/145117; G02B 15/145125
    See application file for complete search history.

(56) References Cited

U.S. PATENT DOCUMENTS

| | | |
|---|---|---|
| 9,264,638 B2 | 2/2016 | Nakamura et al. |
| 9,268,120 B2 | 2/2016 | Shimomura et al. |
| 9,310,592 B2 | 4/2016 | Wakazono et al. |

(Continued)

FOREIGN PATENT DOCUMENTS

| | | |
|---|---|---|
| JP | H02165113 A | 6/1990 |
| JP | H06175022 A | 6/1994 |

(Continued)

OTHER PUBLICATIONS

Notice of Reasons for Rejection issued by the Japan Patent Office dated Mar. 29, 2022 in corresponding JP Patent Application No. 2018-034961, with English translation.

*Primary Examiner* — Alicia M Harrington
(74) *Attorney, Agent, or Firm* — Carter, DeLuca & Farrell LLP

(57) ABSTRACT

A zoom lens includes, from the object side, a positive first lens unit not moving for zooming, a negative second lens unit moving for zooming, and a positive third lens unit moving for zooming. The second lens unit includes a negative lens closest to the object side, the third lens unit consists of a 3-1 sub-lens unit and a 3-2 sub-lens unit from the object side. Conditional expressions $-18.0 < f1/f2 < -3.0$, $0.2 < f21/f2 < 3.6$, $-0.95 < f21/r2 < -0.25$, $7.0 < \beta 2t/\beta 2w < 125.0$, and $0.3 < \beta 31/\beta 32 < 2.5$, are satisfied where f1, f2, and f21 are the focal lengths of the first lens unit, the second lens unit, and the negative lens, r2 is an image-side radius of curvature of the negative lens, (Continued)

$\beta 2w$ and $\beta 2t$ are the lateral magnifications of the second lens unit at the wide angle end and the telephoto end, and f31 and f32 are the focal lengths of the 3-1 sub-lens unit and the 3-2 sub-lens unit.

24 Claims, 12 Drawing Sheets

(56) References Cited

U.S. PATENT DOCUMENTS

| | | | |
|---|---|---|---|
| 9,329,372 | B2 | 5/2016 | Shimomura |
| 9,400,374 | B2 | 7/2016 | Yoshimi et al. |
| 9,678,318 | B2 | 6/2017 | Nakamura et al. |
| 9,716,829 | B2 | 7/2017 | Shimomura |
| 9,904,043 | B2 | 2/2018 | Shimomura et al. |
| 10,095,010 | B2 * | 10/2018 | Takemoto ...... G02B 15/145117 |
| 2014/0049680 | A1 * | 2/2014 | Eguchi ................. G02B 15/173 348/345 |
| 2015/0316755 | A1 * | 11/2015 | Takemoto ............ G02B 15/173 359/683 |
| 2017/0108676 | A1 | 4/2017 | Hori |
| 2017/0108678 | A1 | 4/2017 | Miyazawa et al. |
| 2018/0224640 | A1 | 8/2018 | Shimomura |

FOREIGN PATENT DOCUMENTS

| | | |
|---|---|---|
| JP | 2006039005 A | 2/2006 |
| JP | 2014038236 A | 2/2014 |
| JP | 2016048319 A | 4/2016 |
| JP | 2016048353 A | 4/2016 |
| JP | 2016090591 A | 5/2016 |
| JP | 2016164629 A | 9/2016 |

* cited by examiner

ZOOM LENS AND IMAGE PICKUP APPARATUS

BACKGROUND OF THE INVENTION

Field of the Invention

The present invention relates to a zoom lens and an image pickup apparatus.

Description of the Related Art

In recent years, there has been a demand that an image pickup apparatus such as a television camera, a silver-halide film camera, a digital camera, or a video camera be equipped with a zoom lens having a high magnification, a wide angle of view at the wide angle end, and high optical performance. As a zoom lens with a high magnification and a wide angle of view, there is known a positive lead type zoom lens consisting of at least four lens units overall, with a lens unit having a positive refractive power disposed closest to the object side.

Japanese Patent Application Laid-Open No. 2016-164629 discloses a zoom lens including five lens units which are a positive first lens unit, a negative second lens unit, a positive third lens unit, a positive fourth lens unit, and a positive fifth lens unit and having an angle of view of 68.6° at the wide angle end and a zoom magnification of approximately 103×.

Moreover, Japanese Patent Application Laid-Open No. 2014-038236 discloses a zoom lens including five lens units which are a positive first lens unit, a negative second lens unit, a positive third lens unit, a negative fourth lens unit, and a positive fifth lens unit and having an angle of view of 62.9° at the wide angle end and a zoom magnification of approximately 120×.

When a higher magnification is to be achieved in such zoom lenses, the second lens unit for zooming needs to have a long movable range, which tends to increase the lens diameter of the first lens unit disposed closest to the object side. In addition, when a wider angle of view is to be achieved, the angle of incidence of rays taken into the first lens unit needs to be widened, which again tends to increase the lens diameter of the first lens unit. In order to prevent the increase in the lens diameter of the first lens unit while achieving a wide angle of view and a high magnification at the same time, it is important to reduce the size of the second lens unit for zooming and to shift the principal point position of the second lens unit to the object side because incident rays on the first lens unit depend on the principal point position of the second lens unit.

In order for the above zoom lenses to achieve reduction in overall size, a wide angle of view, and high optical performance over the entire zoom range, it is important to appropriately set the refractive power of the first lens unit, the lens configuration of the second lens unit for zooming, and the like. When they are set inappropriately, it is difficult to obtain a small zoom lens with a high magnification and a wide angle of view.

SUMMARY OF THE INVENTION

The present disclosure provides, for example, a zoom lens advantageous in a wide angle of view, a high zoom ratio, and a small size thereof.

According to the one aspect of the present invention, a zoom lens comprises, in order from an object side to an image side, a first lens unit having a positive refractive power and configured not to be moved for zooming, a second lens unit having a negative refractive power and configured to be moved for zooming, and a third lens unit having a positive refractive power and configured to be moved for zooming, wherein the second lens unit includes a negative lens closest to the object side, the third lens unit consists, in order from the object side to the image side, of a 3-1 sub-lens unit and a 3-2 sub-lens unit, and conditional expressions:

$-18.0 < f1/f2 < -3.0$, $0.2 < f21/f2 < 3.6$, $-0.95 < f21/r2 < -0.25$, $7.0 < \beta2t/\beta2w < 125.0$, and $0.3 < f31/f32 < 2.5$, are satisfied where f1 is a focal length of the first lens unit, f2 is a focal length of the second lens unit, f21 is a focal length of the negative lens, r2 is a radius of curvature of an image-side surface of the negative lens, β2w is a lateral magnification of the second lens unit at a wide angle end, β2t is a lateral magnification of the second lens unit at a telephoto end, f31 is a focal length of the 3-1 sub-lens unit, and f32 is a focal length of the 3-2 sub-lens unit.

According to the another aspect of the present invention, a zoom lens comprises, in order from an object side to an image side, a first lens unit having a positive refractive power and configured not to be moved for zooming, a second lens unit having a negative refractive power and configured to be moved for zooming, and a third lens unit having a negative refractive power and configured to be moved for zooming, wherein the second lens unit includes a negative lens closest to the object side, and the following conditional expressions:

$-18.0 < f1/f2 < -3.0$, $0.2 < f21/f2 < 3.6$, and $-3.0 < f21/r2 < -0.25$, are satisfied where f1 is a focal length of the first lens unit, f2 is a focal length of the second lens unit, f21 is a focal length of the negative lens, and r2 is a radius of curvature of an image-side lens surface of the negative lens.

Further features of the present invention will become apparent from the following description of exemplary embodiments with reference to the attached drawings.

DESCRIPTION OF THE EMBODIMENTS

Preferred embodiments of the present invention are described in detail below based on the accompanying drawings.

A zoom lens according to a first aspect of the preset invention comprises, in order from the object side to the image side, a first lens unit having a positive refractive power configured not to be moved for zooming, a second lens unit having a negative refractive power configured to be moved for zooming, and a third lens unit having a positive refractive power configured to be moved for zooming. The second lens unit includes a negative lens L21 having a negative refractive power at a position closest to the object side. The zoom lens satisfies the following conditional expressions:

$-18.0 < f1/f2 < -3.0$, $0.2 < f21/f2 < 3.6$, $-0.95 < f21/r2 < -0.25$, and $7.0 < \beta2t/\beta2w < 125.0$, where f1 is a focal length of the first lens unit, f2 is a focal length of the second lens unit, f21 is a focal length of the negative lens, r2 is a radius of curvature of the image-plane-side lens surface of the negative lens, $\beta2w$ is a lateral magnification of the second lens unit at a wide angle end, and $\beta2t$ is a lateral magnification of the second lens unit at a telephoto end.

Further, a zoom lens according to a second aspect of the present invention comprises, in order from the object side to the image side, a first lens unit having a positive refractive power configured not to be moved for zooming, a second lens unit having a negative refractive power configured to be moved for zooming, and a third lens unit having a negative refractive power configured to be moved for zooming. The second lens unit includes a negative lens having a negative refractive power at a position closest to the object side. The zoom lens satisfies the following conditional expressions:

$-18.0 < f1/f2 < -3.0$, $0.2 < f21/f2 < 3.6$, and $-3.0 < f21/r2 < -0.25$, where f1 is a focal length of the first lens unit, f2 is a focal length of the second lens unit, f21 is a focal length of the negative lens, and r2 is a radius of curvature of the image-plane-side lens surface of the negative lens.

Further, the zoom lens of the present invention may comprise an additional lens unit at a position closer to the image-plane side than the third lens unit, the lens unit being able to be inserted to and removed from an optical path to change the focal length of the zoom lens.

Figure 1:
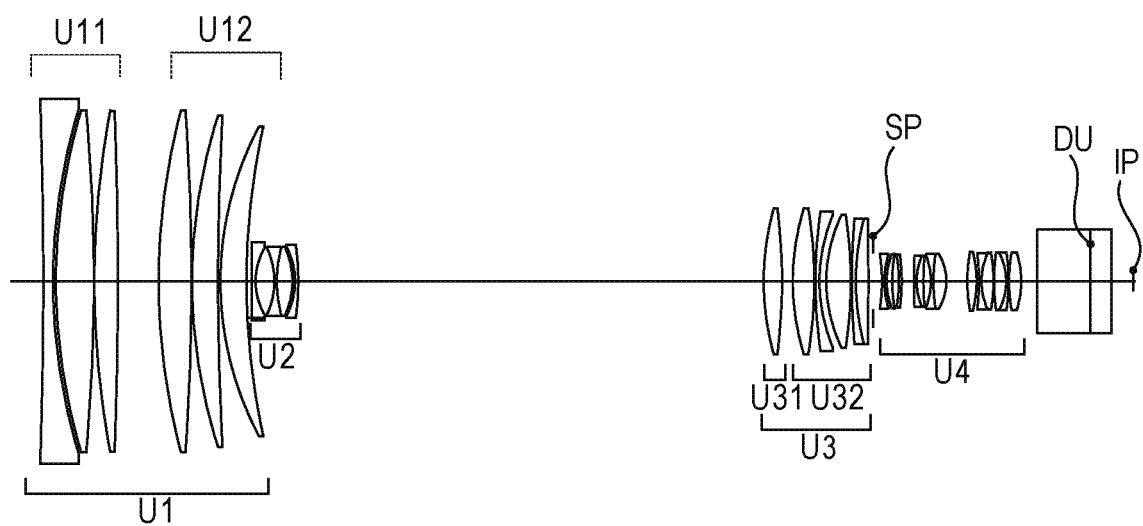
FIG. 1 is a lens sectional diagram of a zoom lens of Numerical Embodiment 1 focused on an object at infinity at the wide angle end.

FIG. 1 is a lens sectional diagram of a zoom lens of Embodiment 1 (Numerical Embodiment 1) of the present invention focused on an object at infinity at a wide angle end (a focal length of 8.5 mm).

Figure 2A:
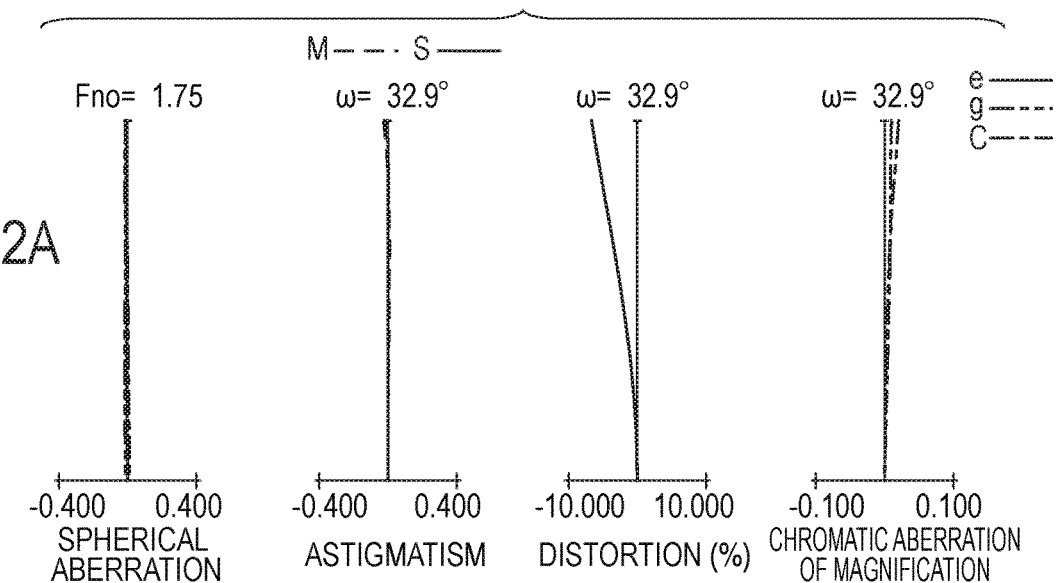
FIG. 2A is an aberration diagram of the zoom lens of Numerical Embodiment 1 focused on an object at infinity at the wide angle end.
Figure 2B:
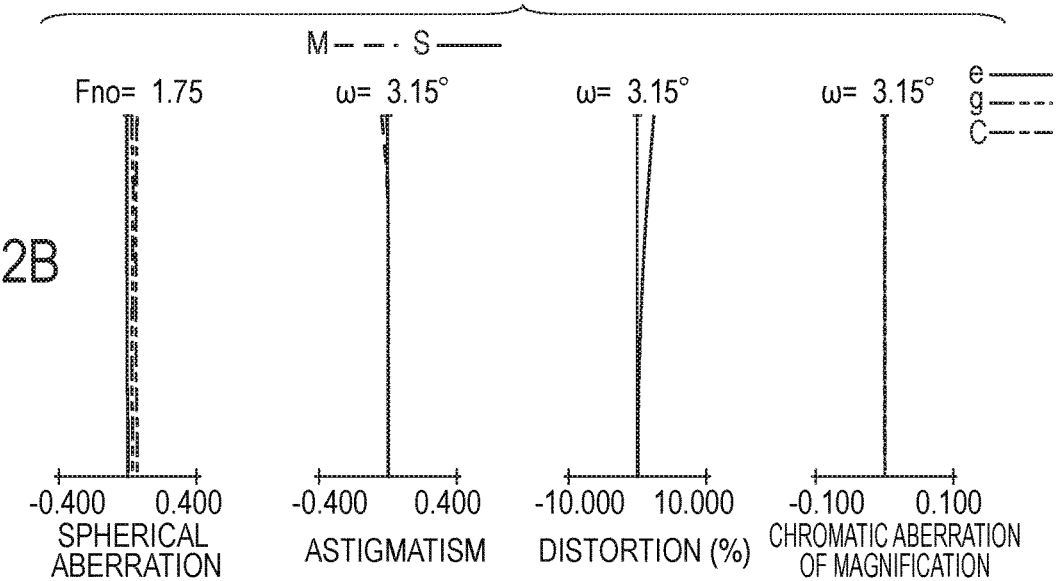
FIG. 2B is an aberration diagram of the zoom lens of Numerical Embodiment 1 focused on an object at infinity at a zoom middle position.
Figure 2C:
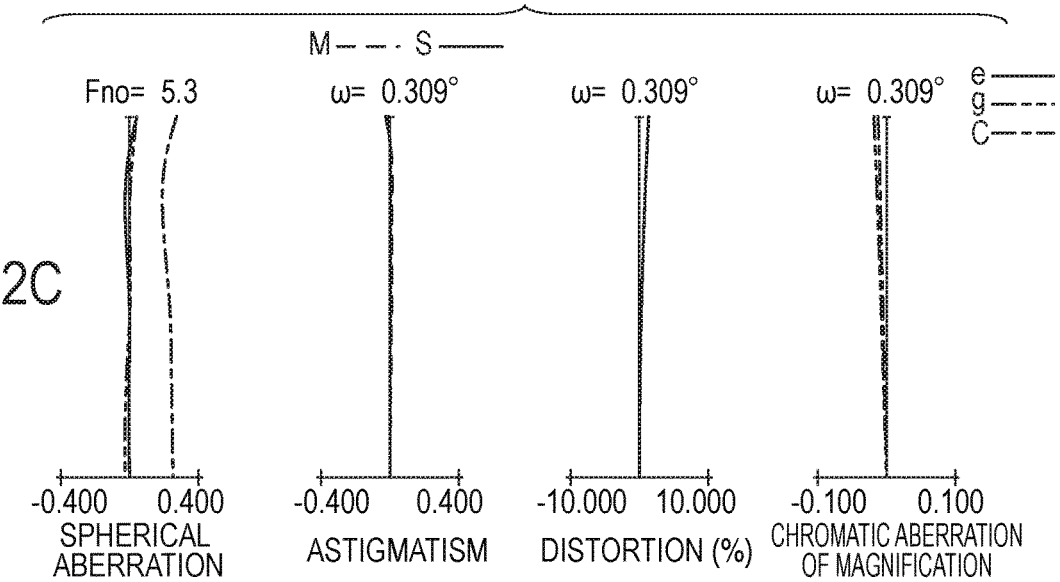
FIG. 2C is an aberration diagram of the zoom lens of Numerical Embodiment 1 focused on an object at infinity at the telephoto end.

FIGS. 2A, 2B, and 2C are aberration diagrams of the zoom lens of Numerical Embodiment 1 focused on an object at infinity at the wide angle end (a focal length of 8.5 mm), at a zoom middle position (a focal length of 100 mm), and at a telephoto end (a focal length of 1020 mm), respectively.

Figure 3:
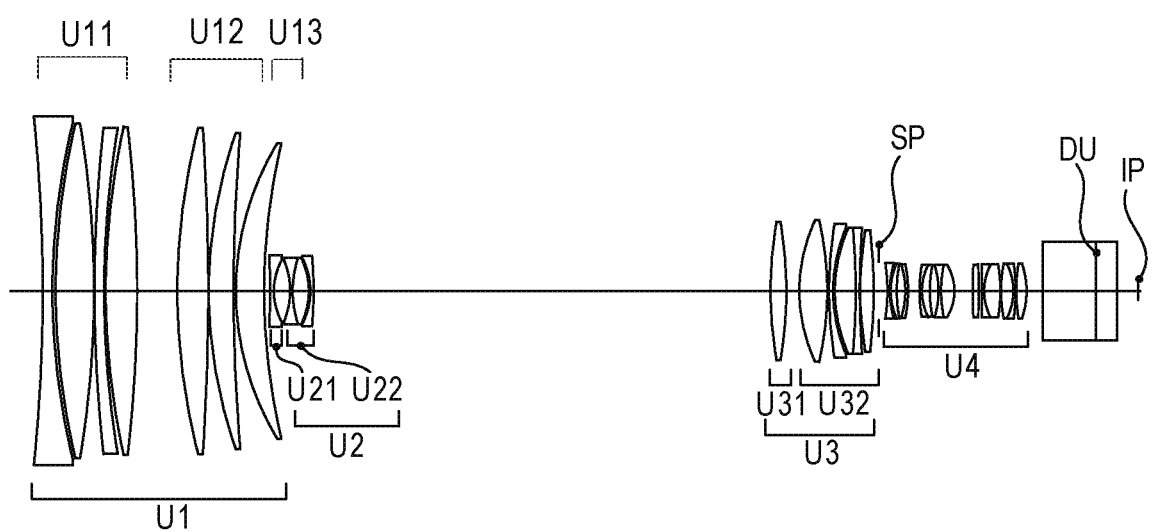
FIG. 3 is a lens sectional diagram of a zoom lens of Numerical Embodiment 2 focused on an object at infinity at the wide angle end.

FIG. 3 is a lens sectional diagram of a zoom lens of Embodiment 2 (Numerical Embodiment 2) of the present invention focused on an object at infinity at a wide angle end (a focal length of 8.8 mm).

Figure 4A:
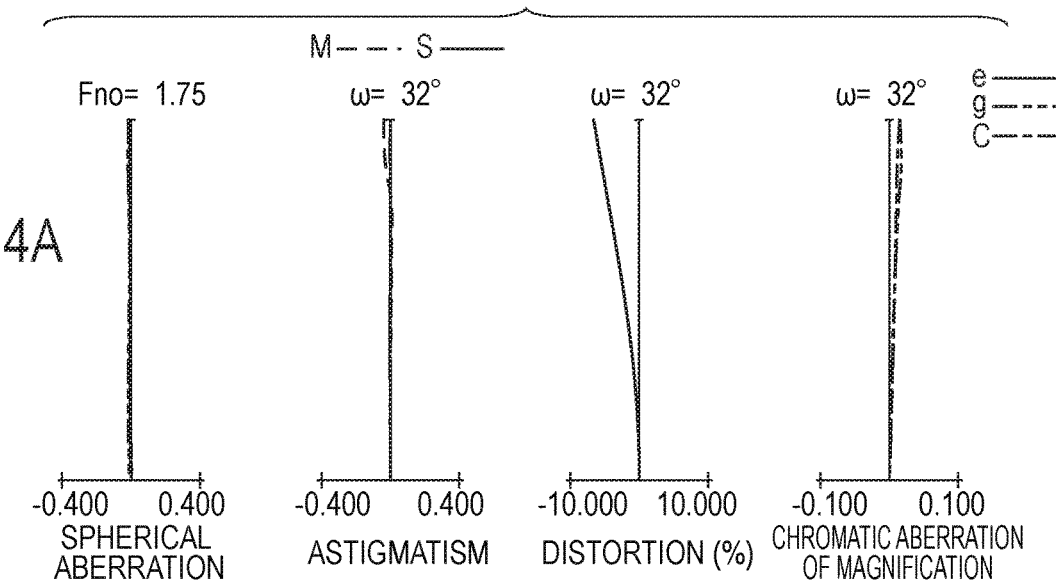
FIG. 4A is an aberration diagram of the zoom lens of Numerical Embodiment 2 focused on an object at infinity at the wide angle end.
Figure 4B:
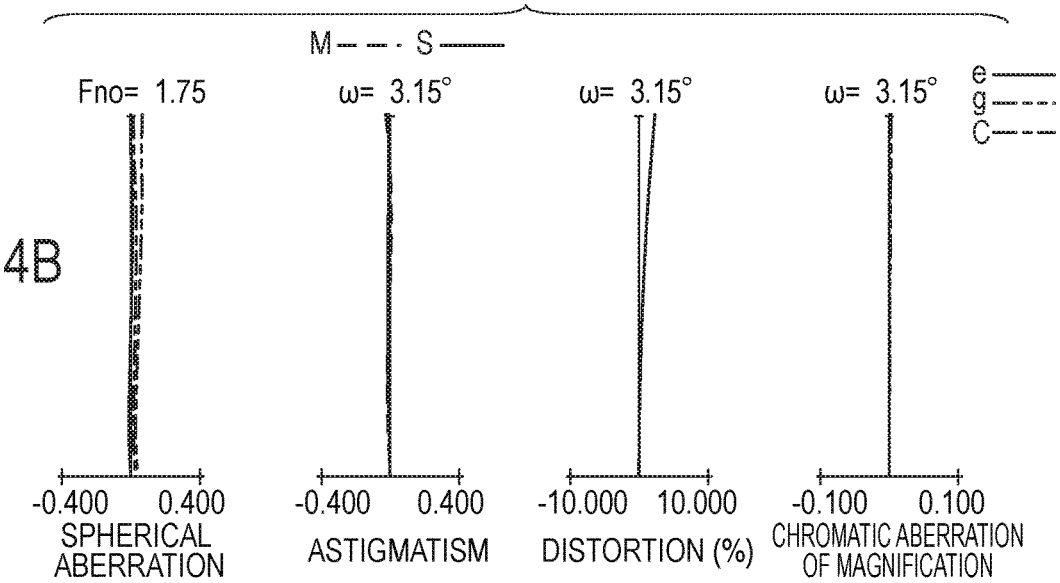
FIG. 4B is an aberration diagram of the zoom lens of Numerical Embodiment 2 focused on an object at infinity at a zoom middle position.
Figure 4C:
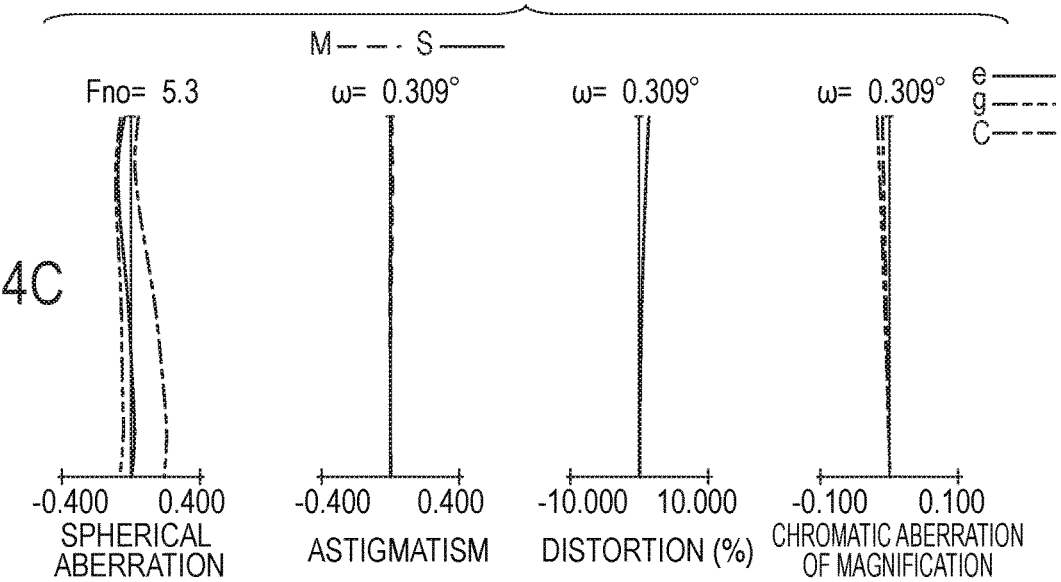
FIG. 4C is an aberration diagram of the zoom lens of Numerical Embodiment 2 focused on an object at infinity at the telephoto end.

FIGS. 4A, 4B, and 4C are aberration diagrams of the zoom lens of Numerical Embodiment 2 focused on an object at infinity at the wide angle end (a focal length of 8.8 mm), at a zoom middle position (a focal length of 100 mm), and at a telephoto end (a focal length of 1020.8 mm), respectively.

Figure 5:
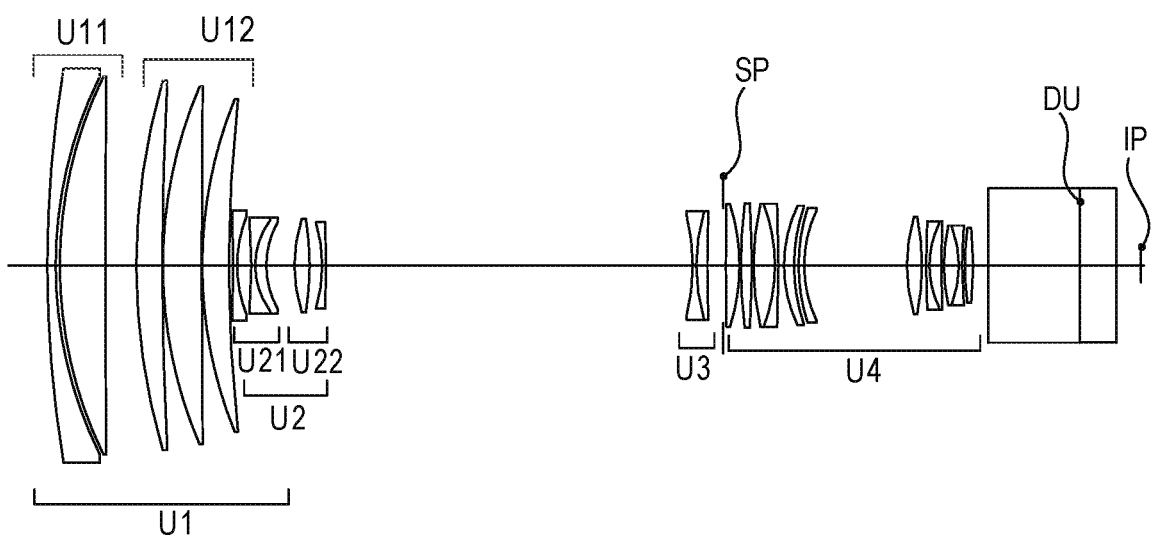
FIG. 5 is a lens sectional diagram of a zoom lens of Numerical Embodiment 3 focused on an object at infinity at the wide angle end.

FIG. 5 is a lens sectional diagram of a zoom lens of Embodiment 3 (Numerical Embodiment 3) of the present invention focused on an object at infinity at a wide angle end (a focal length of 9.5 mm).

Figure 6A:
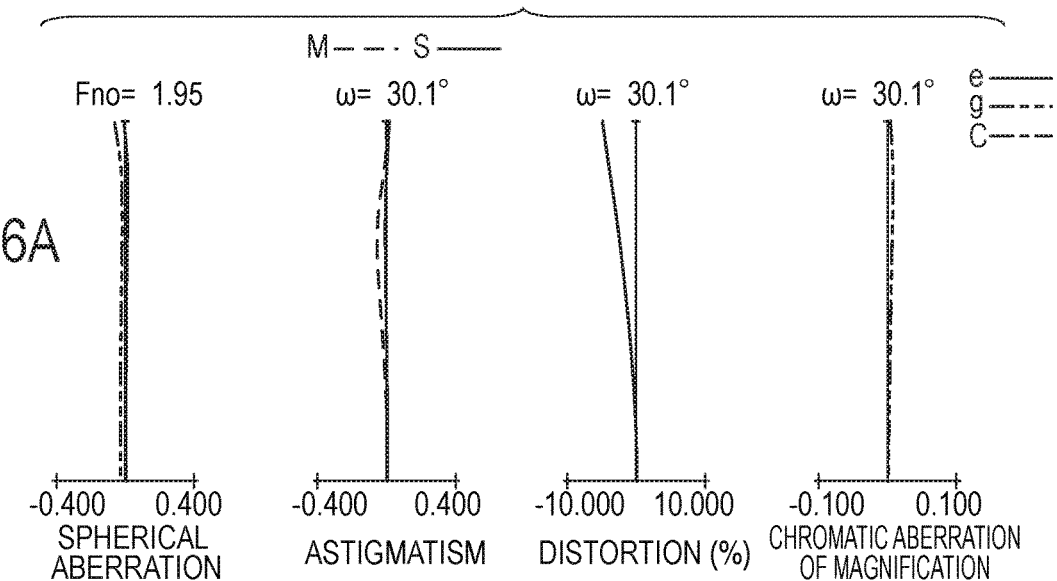
FIG. 6A is an aberration diagram of the zoom lens of Numerical Embodiment 3 focused on an object at infinity at the wide angle end.
Figure 6B:
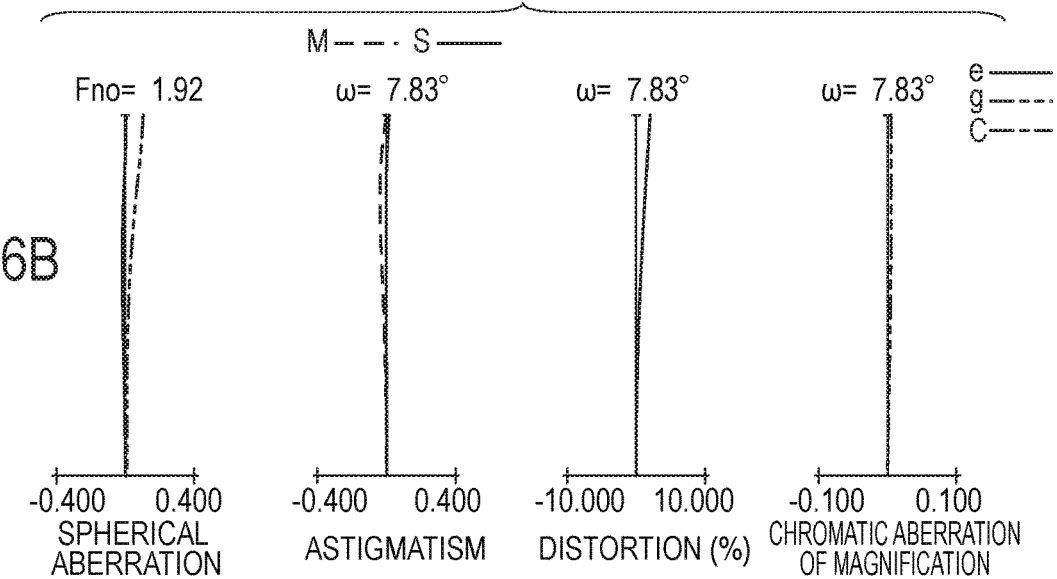
FIG. 6B is an aberration diagram of the zoom lens of Numerical Embodiment 3 focused on an object at infinity at a zoom middle position.
Figure 6C:
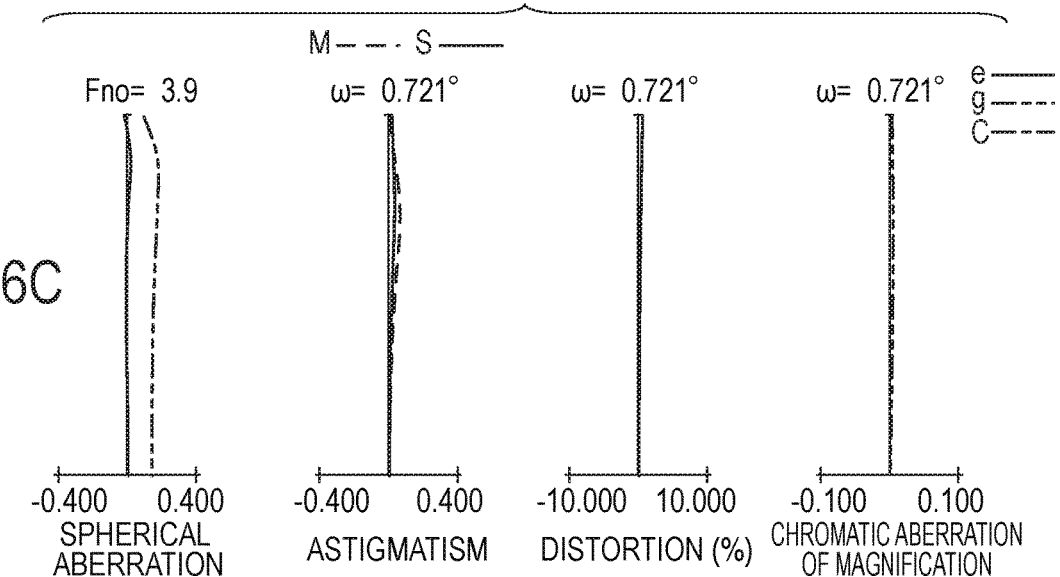
FIG. 6C is an aberration diagram of the zoom lens of Numerical Embodiment 3 focused on an object at infinity at the telephoto end.

FIGS. 6A, 6B, and 6C are aberration diagrams of the zoom lens of Numerical Embodiment 3 focused on an object at infinity at the wide angle end (a focal length of 9.5 mm), at a zoom middle position (a focal length of 40 mm), and at a telephoto end (a focal length of 437 mm), respectively.

Figure 7:
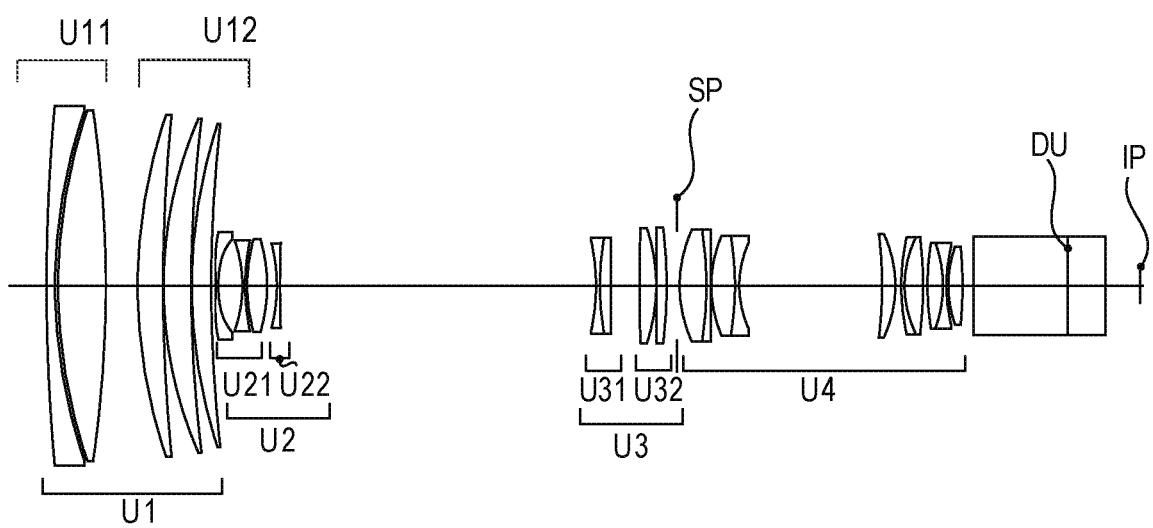
FIG. 7 is a lens sectional diagram of a zoom lens of Numerical Embodiment 4 focused on an object at infinity at the wide angle end.

FIG. 7 is a lens sectional diagram of a zoom lens of Embodiment 4 (Numerical Embodiment 4) of the present invention focused on an object at infinity at a wide angle end (a focal length of 9.3 mm).

Figure 8A:
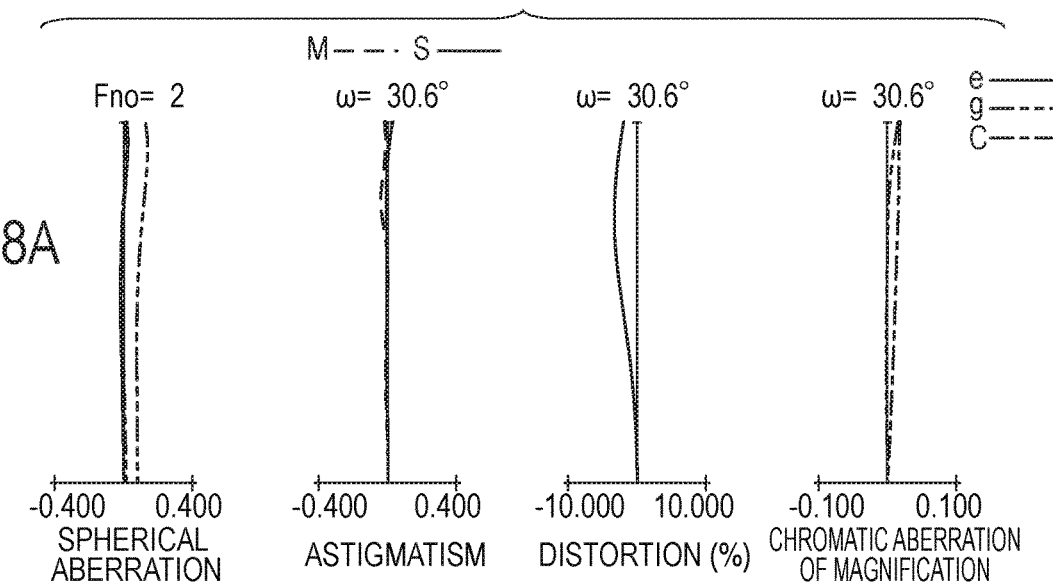
FIG. 8A is an aberration diagram of the zoom lens of Numerical Embodiment 4 focused on an object at infinity at the wide angle end.
Figure 8B:
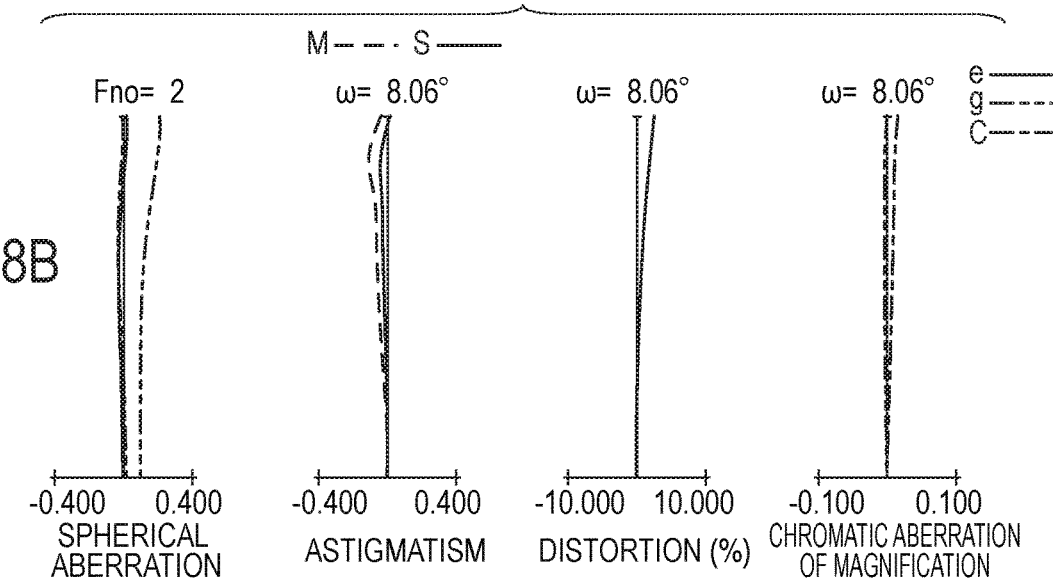
FIG. 8B is an aberration diagram of the zoom lens of Numerical Embodiment 4 focused on an object at infinity at a zoom middle position.
Figure 8C:
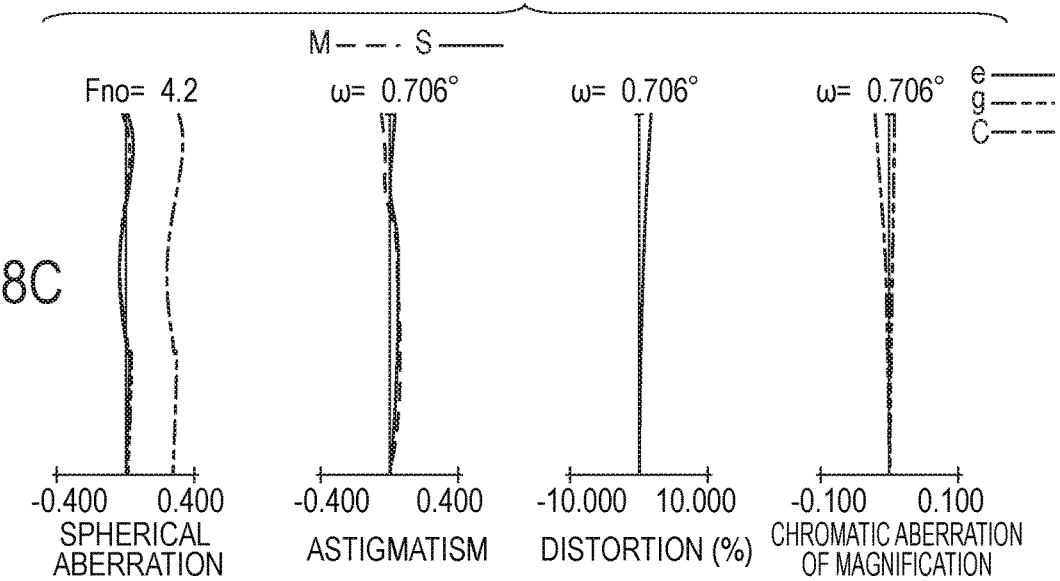
FIG. 8C is an aberration diagram of the zoom lens of Numerical Embodiment 4 focused on an object at infinity at the telephoto end.

FIGS. 8A, 8B, and 8C are aberration diagrams of the zoom lens of Numerical Embodiment 4 focused on an object at infinity at the wide angle end (a focal length of 9.3 mm), at a zoom middle position (a focal length of 35 mm), and at a telephoto end (a focal length of 446.4 mm), respectively.

Figure 9:
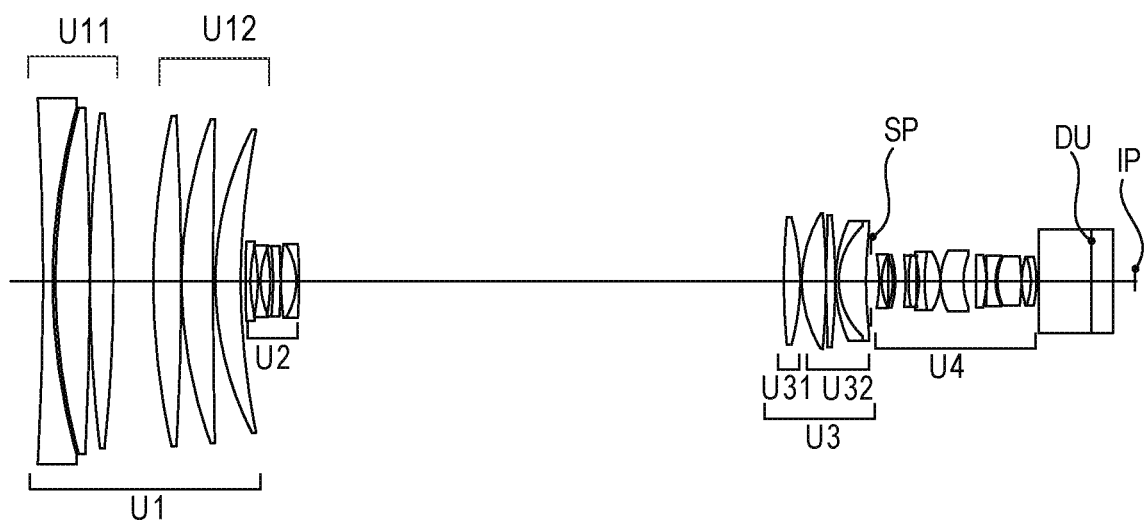
FIG. 9 is a lens sectional diagram of a zoom lens of Numerical Embodiment 5 focused on an object at infinity at the wide angle end.

FIG. 9 is a lens sectional diagram of a zoom lens of Embodiment 5 (Numerical Embodiment 5) of the present invention focused on an object at infinity at a wide angle end (a focal length of 8.0 mm).

Figure 10A:
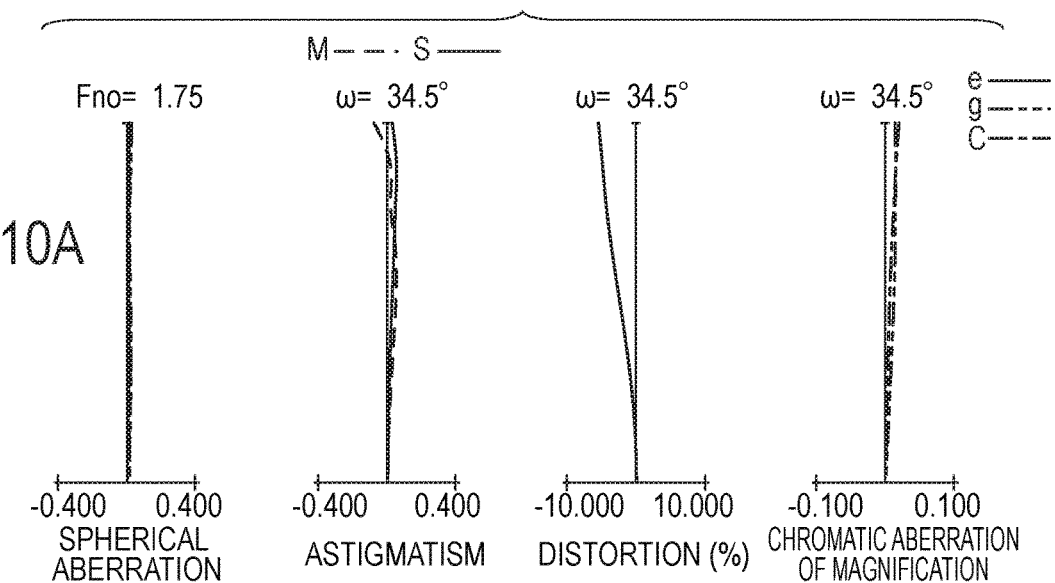
FIG. 10A is an aberration diagram of the zoom lens of Numerical Embodiment 5 focused on an object at infinity at the wide angle end.
Figure 10B:
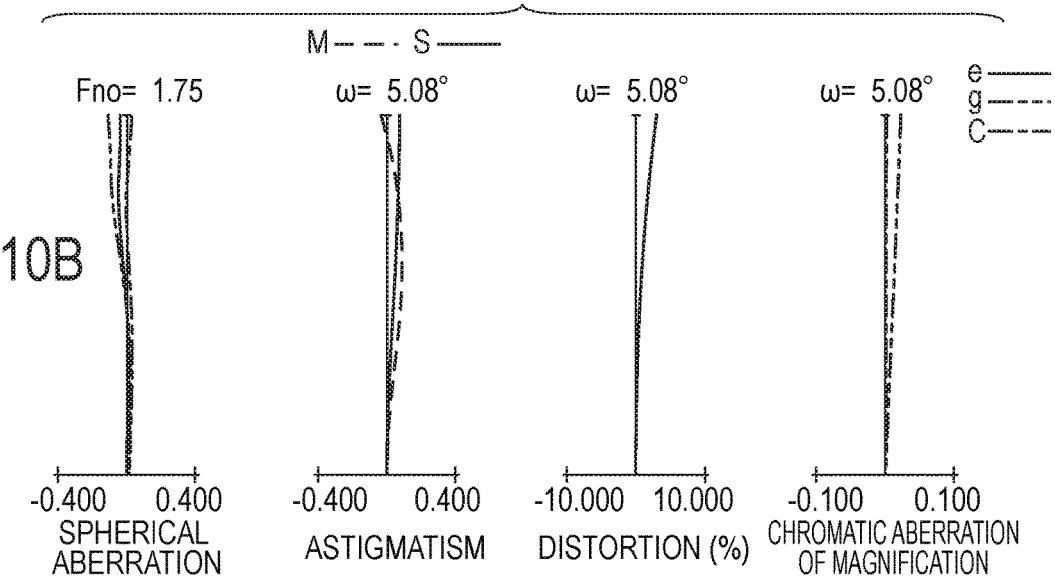
FIG. 10B is an aberration diagram of the zoom lens of Numerical Embodiment 5 focused on an object at infinity at a zoom middle position.
Figure 10C:
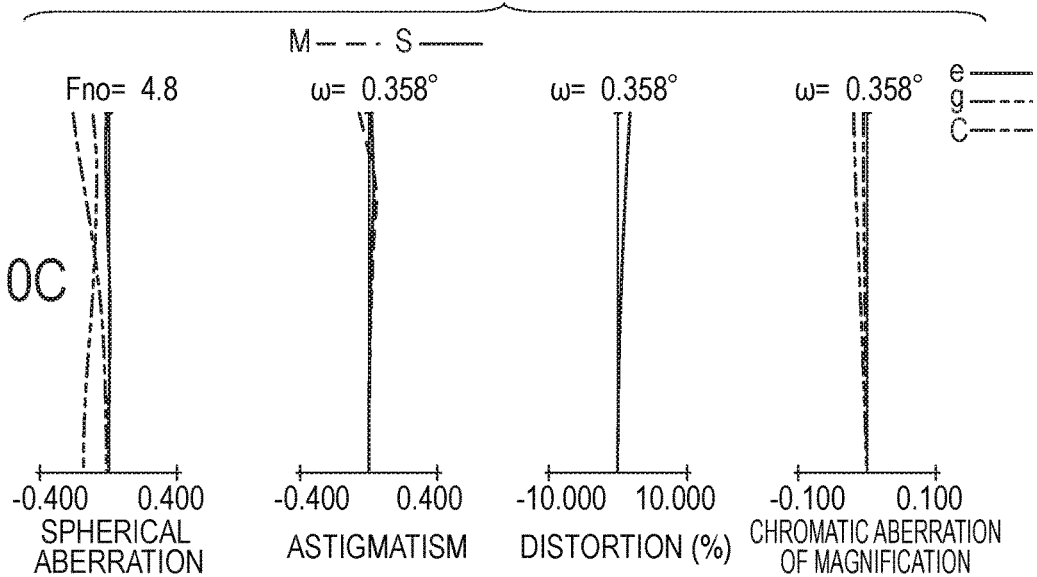
FIG. 10C is an aberration diagram of the zoom lens of Numerical Embodiment 5 focused on an object at infinity at the telephoto end.

FIGS. 10A, 10B, and 10C are aberration diagrams of the zoom lens of Numerical Embodiment 5 focused on an object at infinity at the wide angle end (a focal length of 8.0 mm), at a zoom middle position (a focal length of 62.16 mm), and at a telephoto end (a focal length of 880 mm), respectively.

Figure 11:
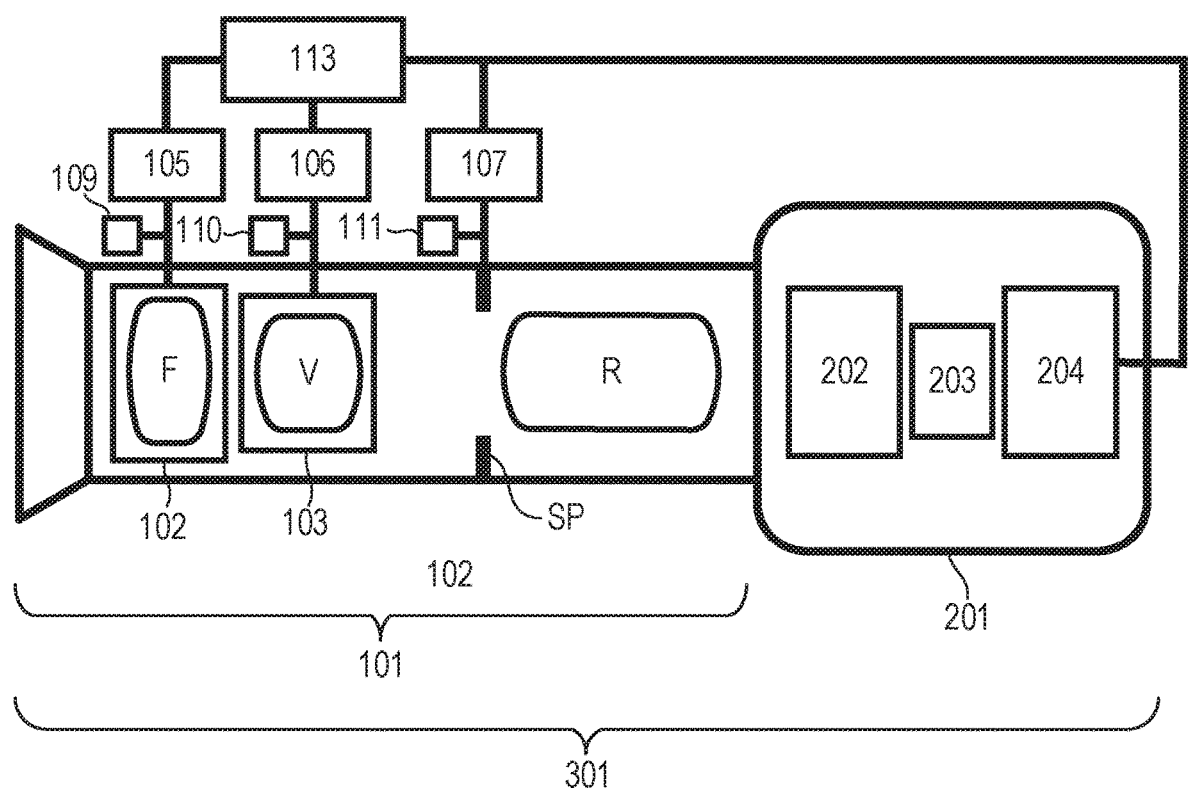
FIG. 11 is a main-part schematic diagram of an image pickup apparatus of the present invention.

FIG. 11 is a main-part schematic diagram of an image pickup apparatus of the present invention.

Figure 12:
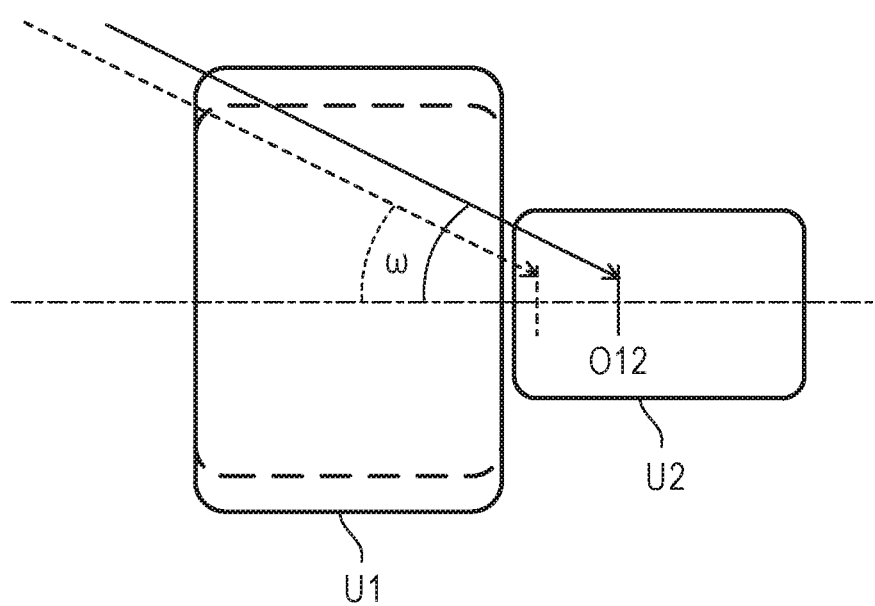
FIG. 12 is a diagram illustrating the principal point position of a second lens unit of the zoom lens of the present invention.

FIG. 12 is a diagram illustrating the principal point position of a second lens unit of the zoom lens of the present invention.

In each lens sectional diagram, the left hand corresponds to the subject (object) side (or the front side), and the right hand corresponds to the image side (or the rear side). In each lens sectional diagram, U1 denotes a first lens unit having a positive refractive power and including a focusing lens unit; U2, a second lens unit which has a negative refractive power, includes a zooming lens unit, and is configured to be moved to the image side on the optical axis for zooming from the wide angle end to the telephoto end; and U3 denotes a third lens unit which has a positive refractive power, includes a zooming lens unit, and is configured to be moved on the optical axis for zooming from the wide angle end to the telephoto end. The second lens unit U2 and the third lens unit U3 form the zooming system.

In the present invention, in principle, borders of the lens units are defined by adjacent optical surfaces the distances between which change during zooming. However, the second lens unit U2 and the third lens unit U3 are each constituted by two sub-lens units when satisfying the condition below. When the second lens unit U2 or the third lens unit U3 is constituted by two sub-lens units, the combined focal length of the second lens unit U2 is negative and the combined focal length of the third lens unit U3 is positive.

The second lens unit U2 is regarded as consisting of a 2-1 sub-lens unit U21 and a 2-2 sub-lens unit U22, which are adjacently disposed in order from the object side to the image side on the image side of the first lens unit U1 when the following conditional expression is satisfied:

$$0.90 < m21/m22 < 1.12, \tag{1}$$

where m21 and m22 are amounts by which the 2-1 sub-lens unit U21 and the 2-2 sub-lens unit U22 respectively move or shift for zooming from the wide angle end position to the telephoto end position (zoom strokes). In this case, the focal length (or refractive power) of the second lens unit U2 is evaluated based on the combined focal length of the 2-1 sub-lens unit U21 and the 2-2 sub-lens unit U22.

It is more preferable when Conditional Expression (1) is set as follows:

$$0.93 < m21/m22 < 1.10. \tag{1a}$$

It is even more preferable when Conditional Expression (1a) is set as follows:

$$0.96 < m21/m22 < 1.08. \tag{1b}$$

The third lens unit U3 is regarded as consisting of a 3-1 sub-lens unit U31 and a 3-2 sub-lens unit U32, which are adjacently disposed in order from the object side to the image side on the image side of the second lens unit U2, when the following conditional expression is satisfied:

$$0.90 < m31/m32 < 1.12, \tag{2}$$

where m31 and m32 are amounts by which the 3-1 sub-lens unit U31 and the 3-2 sub-lens unit U32 respectively move or shift for zooming from the wide angle end position to the telephoto end position (zoom strokes). In this case, the focal length (or refractive power) of the third lens unit U3 is evaluated based on the combined focal length of the 3-1 sub-lens unit U31 and the 3-2 sub-lens unit U32. The moving lens units satisfying the relation in Expression (2) tend to have similar aberration sensitivity and zoom shares at each zoom position. There is a known technique for offering an anti-vibration function by moving the lens units in a direction perpendicular to the optical-axis direction. However, mainly from such viewpoints as a zoom ratio and widening of the angle of view, the present invention employs the lens-unit splitting based on Expression (2) for the power arrangement of the zoom lens. Hereinbelow, various pieces of data on the third lens unit U3 are calculated assuming the above lens-unit splitting.

It is more preferable when Conditional Expression (2) is set as follows:

$$0.93 < m31/m32 < 1.10. \tag{2a}$$

It is more preferable when Conditional Expression (2a) is set as follows:

$$0.96 < m31/m32 < 1.08. \tag{2b}$$

SP denotes a stop (or an aperture stop); U4, a fourth lens unit U4 configured to receive rays having passed through the third lens unit U3 and the stop and form an image on the image plane; DU, a color separation prism, an optical filter, or the like, which is depicted as a glass block in the lens sectional diagrams; IP, an image plane, which corresponds to the image plane of a solid-state image pickup element (photo-electric conversion element) that receives an image formed by the zoom lens and performs photo-electric conversion.

The zoom lens of each embodiment includes a lens unit (extender) which can be inserted to and removed from an optical path. The lens unit is an optical member in the fourth lens unit U4, and changes (or shifts) the overall focal length range of the zoom lens by retreating from the optical path. Further, when part of the optical members in the fourth lens unit U4 is moved along the optical axis, the zoom lens can have a back focus adjustment function. The zoom lens of each embodiment described above has a zooming type suitable for achieving a high magnification while offering favorable optical performance.

For zooming, the zoom lens of each embodiment includes the second lens unit U2 having a negative refractive power and the third lens unit U3 and thus form the zooming system with more than one lens unit and perform zooming by moving the lens units. The zoom lens thus uses what is called a multi-unit zooming method to easily achieve a high magnification and favorable optical performance.

In the section for spherical aberration in the longitudinal aberration diagrams, e-line (solid line) and g-line (dot-dotdash line) are shown. In the section for astigmatism, the meridional image plane (M: dotted line) and the sagittal image plane (S: solid line) for e-line are shown. Chromatic aberration of magnification is shown for g-line (dot-dot-dash line). Fno denotes an f-number, and ω denotes a half angle of view. In each longitudinal aberration diagram, spherical aberration is depicted on a scale of ±0.4 mm; astigmatism, on a scale of ±0.4 mm; distortion, on a scale of ±10%; and chromatic aberration of magnification, on a scale of ±0.1 mm. Note that in the following embodiments, the wide angle end and the telephoto end refer to zoom positions which are available ends of the zoom range in which the second lens unit U2 for zooming or one of the sub-lens units constituting the second lens unit U2 can move on the optical axis mechanically.

In a zoom lens according to a first aspect of the present invention, the second lens unit U2 consists of, in order from the object side to the image side, the 2-1 sub-lens unit U21 having a negative refractive power and the 2-2 sub-lens unit U22, and includes a negative lens L21 having a negative refractive power at a position closest to the object side. The third lens unit U3 consists of, in order from the object side to the image side, the 3-1 sub-lens unit U31 and the 3-2 sub-lens unit U32 both having a positive refractive power.

The zoom lens of the first aspect is characterized by satisfying the following conditional expressions:

$$-18.0 < f1/f2 < -3.0, \quad (3)$$

$$0.2 < f21/f2 < 3.6, \quad (4)$$

$$-0.95 < f21/r2 < -0.25, \text{ and} \quad (5)$$

$$7.0 < \beta 2t/\beta 2w < 125.0, \quad (6)$$

where f1 is the focal length of the first lens unit U1, f2 is the focal length of the second lens unit U2, f21 is the focal length of the negative lens L21, r2 is the radius of curvature of the image-plane-side lens surface of the negative lens L21, β2w is the lateral magnification of the second lens unit U2 at the wide angle end, and β2t is the lateral magnification of the second lens unit U2 at the telephoto end.

Next, technical meanings of the above conditional expressions are described.

Conditional Expressions (3) to (6) are defined for a zoom lens to achieve high performance, a high magnification, a wide angle of view, and reduction in size and weight all at the same time. Conditional Expressions (3) to (6) define appropriate ranges of the ratio of the power of the first lens unit U1 to the power of the second lens unit U2 (the ratio of the focal length of the first lens unit U1 to the focal length of the second lens unit U2), zoom ratios, and the appropriate lens configuration of the second lens unit U2.

Conditional Expression (3) defines the ratio of the focal length of the first lens unit U1 to the focal length of the second lens unit U2 in the zoom lens according to the first aspect of the present invention. When Conditional Expression (3) is satisfied, the ratio of the power of the first lens unit U1 to the power of the second lens unit U2 can be set to an appropriate value optimal for the zoom lens to have a long focal length at the telephoto end in particular. If the upper limit of Conditional Expression (3) is not satisfied, it is difficult to correct aberration of the first lens unit U1 at the telephoto end, or it is difficult for the zoom lens to have a high magnification due to the lack of power necessary for the zooming of the second lens unit U2. If the lower limit of Conditional Expression (3) is not satisfied, the power of the second lens unit U2 is relatively too strong, which makes it difficult to reduce the size and weight of the first lens unit U1 and to reduce aberration variation during zooming.

It is more preferable when Conditional Expression (3) is set as follows:

$$-15.0 < f1/f2 < -3.6. \quad (3a)$$

It is even more preferable when Conditional Expression (3a) is set as follows:

$$-13.5 < f1/f2 < -5.0. \quad (3b)$$

Herein, the first lens unit U1 refers to the entire lens unit which is disposed closer to the object side than the second lens unit U2 and maintains a constant distance to the image plane during zooming. In the present invention, the first lens unit U1 includes a mechanism for moving a part of or the entire first lens unit for focusing. The focal length f1 of the first lens unit U1 is the focal length of the first lens unit U1 with the zoom lens being focused on an object at infinity.

Conditional Expression (4) defines the ratio of the focal length of the negative lens L21, which has a negative refractive power and is disposed closest to the object side in the second lens unit U2, to the overall focal length of the second lens unit U2.

When Conditional Expression (4) is satisfied, the negative lens L21 can have a sufficient negative power to effectively shift the object-side principal point position of the second lens unit U2 to the object side. Thus, reduction in the size and weight of the first lens unit U1 can be easily achieved. If the upper limit of Conditional Expression (4) is not satisfied, the power of the negative lens L21 is relatively too weak, which makes it difficult to widen the angle of view of the zoom lens. If the lower limit of Conditional Expression (4) is not satisfied, the power of the second lens unit U2 is relatively too weak, which increases the zoom stroke of the second lens unit U2 when a higher magnification is to be achieved, and thereby hinders reduction in the size and weight of the zoom lens.

It is more preferable when Conditional Expression (4) is set as follows:

$$0.4 < f21/f2 < 3.2. \quad (4a)$$

It is even more preferable when Conditional Expression (4a) is set as follows:

$$0.6 < f21/f2 < 2.4. \quad (4b)$$

Conditional Expression (5) defines the relation between the focal length of the negative lens L21, which has a negative refractive power and is disposed closest to the object side in the second lens unit U2 of the zoom lens of the present invention, and the radius of curvature r2 of the image-plane-side lens surface of the negative lens L21. In the present invention, the radius of curvature of a lens is, if the lens is a regular spherical lens, what is called a paraxial curvature radius R, which is described as r in the numerical embodiments of the present invention. If the lens is aspherical, the radius of curvature of the lens is a reference radius of curvature R calculated from the position of the vertex of a lens surface on the optical axis and the position of the intersection between an axial ray and a circle of a pupil diameter measured when the stop is open at the wide angle end. By thus defining the relation, the paraxial power of the negative lens L21 can be appropriately calculated.

Now, referring to FIG. 12, a description is given of an advantageous effect produced by shifting the object-side principal point position of the second lens unit U2 to the object side. In FIG. 12, U1 denotes the first lens unit U1; U2, the second lens unit U2; O12, the object-side principal point position of the second lens unit U2; and ω, a half angle of view. Widening the angle of view of the zoom lens tends to increase the lens effective diameter of the first lens unit U1 on the object side. If the object-side principal point position O12 of the second lens unit U2 is at the position indicated by the solid line in FIG. 12, the first lens unit U1 needs to have the effective lens diameter as indicated by the solid line.

Then, when the object-side principal point position O12 of the second lens unit U2 is shifted to the position indicated by the dotted line in FIG. 12, the first lens unit U1 can have the effective lens diameter indicated by the dotted line even with the same half angle of view ω. In practice, when the lens diameter is reduced, the lens thickness can also be reduced, and therefore, size and weight reduction effect can be produced even more. Hence, shifting the object-side principal point position of the second lens unit U2 to the object side allows the zoom lens to effectively achieve a wide angle of view and reduction in size and weight.

By satisfying Conditional Expression (5), the negative lens L21 has a shape advantageous for shifting the principal point sufficiently to the object side, and therefore, the zoom lens can achieve a wide angle of view and reduction in size and weight. If the upper limit of Conditional Expression (5) is not satisfied, the radius of curvature r1 is relatively too small, which requires to have an excessively long distance between the first lens unit U1 and the second lens unit U2 because of a retention mechanism or the like, and therefore makes it difficult for the zoom lens to achieve a wide angle of view and reduction in size and weight at the same time. If the lower limit of Conditional Expression (5) is not satisfied, the negative refractive power of the negative lens L21 is too weak, which makes it difficult for the zoom lens to achieve a wide angle of view and reduction in size and weight.

It is more preferable when Conditional Expression (5) is set as follows:

$$-0.94<f21/r2<-0.30. \tag{5a}$$

It is even more preferable when Conditional Expression (5a) is set as follows:

$$-0.93<f21/r2<-0.50. \tag{5b}$$

It is even more preferable when Conditional Expression (5b) is set as follows:

$$-0.93<f21/r2<-0.78. \tag{5c}$$

Conditional Expression (6) defines the zoom share to be borne by the second lens unit U2 when the zoom lens of the present invention zooms from the wide angle end to the telephoto end. By satisfying Conditional Expression (6), the zoom lens can achieve reduction in size and weight and a high magnification efficiently. If the upper limit of Conditional Expression (6) is not satisfied, the zoom stroke and the power of the second lens unit U2 necessary for achieving the zoom ratio to be attained by the second lens unit U2 are too high, which makes it difficult for the zoom lens to achieve reduction in size and weight and high performance. If the lower limit of Conditional Expression (6) is not satisfied, the zoom ratio attained by the second lens unit U2 is too small, which makes it difficult for the zoom lens to achieve a high magnification and a wide angle of view.

It is more preferable when Conditional Expression (6) is set as follows:

$$8.5<\beta2t/\beta2w<80.0. \tag{6a}$$

It is even more preferable when Conditional Expression (6a) is set as follows:

$$9.0<\beta2t/\beta2w<75.0. \tag{6b}$$

It is even more preferable when Conditional Expression (6b) is set as follows:

$$19.0<\beta2t/\beta2w<65.0. \tag{6c}$$

It is preferable that the zoom lens according to the first aspect of the present invention further satisfy at least one of the following conditions.

In the first aspect of the present invention, the 3-1 sub-lens unit U31 have a positive refractive power, the 3-2 sub-lens unit U32 have a positive refractive power, and the following conditional expression:

$$0.3<f31/f32<3.4, \tag{7}$$

is preferably satisfied where f31 is the focal length of the 3-1 sub-lens unit U31, and f32 is the focal length of the 3-2 sub-lens unit U32. When the third lens unit U3 having a positive refractive power is split into the 3-1 sub-lens unit U31 having a positive refractive power and the 3-2 sub-lens unit U32 having a positive refractive power, the combined power of the third lens unit U3 is efficiently increased to facilitate a higher magnification. If the upper and lower limits of Conditional Expression (7) are not satisfied, the power of either of the units is relatively too weak, which makes it difficult for the zoom lens to achieve reduction in size and weight and to fully produce aberration correction capability.

It is more preferable when Conditional Expression (7) is set as follows:

$$0.35<f31/f32<3.0. \tag{7a}$$

It is even more preferable when Conditional Expression (7a) is set as follows:

$$0.4<f31/f32<2.5. \tag{7b}$$

It is even more preferable when Conditional Expression (7b) is set as follows:

$$0.5<f31/f32<1.8. \tag{7c}$$

Next, a zoom lens according to a second aspect of the present invention is described.

The zoom lens according to the second aspect of the present invention includes, in order from the object side to the image side, a first lens unit having a positive refractive power, a second lens unit having a negative refractive power, and a third lens unit having a negative refractive power. The first lens unit maintains a constant distance to the image plane for zooming, while the second and third lens units move on the optical axis for zooming. The second lens unit has a negative lens L21 closest to the object side. The zoom lens satisfies the following conditional expressions:

$$-18.0<f1/f2<-3.0, \tag{8}$$

$$0.2<f21/f2<3.6, \text{ and} \tag{9}$$

$$-3.0<f21/r2<-0.25, \tag{10}$$

where f1 is the focal length of the first lens unit, f2 is the focal length of the second lens unit, f21 is the focal length of the negative lens L21, and r2 is the radius of curvature of the image-plane-side lens surface of the negative lens L21.

The zoom lens of the second aspect of the present invention differs from that of the first aspect mainly in that a lens unit having a negative refractive power is disposed as the third lens unit and that it is not assumed in advance that the third lens unit is split. Like the zoom lens of the first aspect, the zoom lens of the second aspect may also include, as a lens unit disposed closer to the image side than the third lens unit, a lens unit which can be inserted to and removed from the optical path to change the focal length of the zoom lens.

Conditional Expressions (8) to (10) are defined for the zoom lens to achieve high performance, a high magnification, a wide angle of view, and reduction in size and weight all at the same time. Conditional Expressions (8) to (10) define appropriate ranges of the ratio of the power of the first lens unit U1 to the power of the second lens unit U2 (the ratio of the focal length of the first lens unit U1 to the focal length of the second lens unit U2), the zoom ratios, and the appropriate lens configuration of the second lens unit U2.

Conditional Expression (8) defines the ratio of the focal length of the first lens unit U1 to the focal length of the second lens unit U2 in the zoom lens according to the second aspect of the present invention. By satisfying Conditional Expression (8), the ratio of the power of the first lens unit U1 to the power of the second lens unit U2 can be set to an appropriate value optimal for the zoom lens to have a long focal length at the telephoto end in particular. If the upper limit of Conditional Expression (8) is not satisfied, it is difficult to correct aberration of the first lens unit U1 at the telephoto end, or it is difficult for the zoom lens to have a high magnification due to the lack of power necessary for the zooming of the second lens unit U2. If the lower limit of Conditional Expression (8) is not satisfied, the power of the second lens unit U2 is relatively too strong, making it difficult to achieve reduction in the size and weight of the first lens unit U1 and to reduce aberration variation during zooming.

It is more preferable when Conditional Expression (8) is set as follows:

$$-15.0<f1/f2<-3.6. \tag{8a}$$

It is even more preferable when Conditional Expression (8a) is set as follows:

$$-14.5<f1/f2<-4.0. \tag{8b}$$

It is even more preferable when Conditional Expression (8b) is set as follows:

$$-13.5<f1/f2<-5.0. \tag{8c}$$

Herein, the first lens unit U1 refers to the entire lens unit which is disposed closer to the object side than the second lens unit U2 and maintains a constant distance to the image plane during zooming. In the present invention, the first lens unit U1 includes a mechanism for moving a part of or the entire first lens unit for focusing. The focal length f1 of the first lens unit U1 is the focal length of the first lens unit U1 with the zoom lens being focused on an object at infinity.

Conditional Expression (9) defines the ratio of the focal length of the negative lens L21, which has a negative refractive power and is disposed closest to the object side in the second lens unit U2, to the overall focal length of the second lens unit U2. When Conditional Expression (9) is satisfied, the negative lens L21 has a sufficient negative power to effectively shift the object-side principal point position of the second lens unit U2 to the object side. Thus, reduction in the size and weight of the first lens unit U1 can be easily achieved. If the upper limit of Conditional Expression (9) is not satisfied, the power of the negative lens L21 is relatively too weak, which makes it difficult to widen the angle of view of the zoom lens. If the lower limit of Conditional Expression (9) is not satisfied, the power of the second lens unit U2 is relatively too weak, which increases the zoom stroke of the second lens unit U2 when a higher magnification is to be achieved, and thereby hinders reduction in the size and weight of the zoom lens.

It is more preferable when Conditional Expression (9) is set as follows:

$$0.4<f21/f2<3.2. \tag{9a}$$

It is even more preferable when Conditional Expression (9a) is set as follows:

$$0.5<f21/f2<2.8. \tag{9b}$$

It is even more preferable when Conditional Expression (9b) is set as follows:

$$0.6<f21/f2<2.4. \tag{9c}$$

Conditional Expression (10) defines the relation between the focal length of the negative lens L21, which has a negative refractive power and is disposed closest to the object side in the second lens unit U2 of the zoom lens of the present invention, and the radius of curvature r2 of the image-plane-side lens surface of the negative lens L21. In the present invention, the radius of curvature of a lens is, if the lens is a regular spherical lens, what is called a paraxial curvature radius R, which is described as r in the numerical embodiments of the present invention. If the lens is aspherical, the radius of curvature of the lens is a reference radius of curvature R calculated from the position of the vertex of a lens surface on the optical axis and the position of the intersection between an axial ray and a circle of a pupil diameter measured when the stop is open at the wide angle end. By thus defining the relation, the paraxial power of the negative lens L21 can be appropriately calculated.

By satisfying Conditional Expression (10), the negative lens L21 has a shape advantageous for shifting the principal point sufficiently to the object side, and therefore, the zoom lens can achieve a wide angle of view and reduction in size and weight easily. If the upper limit of Conditional Expression (10) is not satisfied, the radius of curvature r1 is relatively too small, which requires to have an excessively long distance between the first lens unit U1 and the second lens unit U2 because of a retention mechanism or the like, and therefore makes it difficult for the zoom lens to achieve a wide angle of view and reduction in size and weight at the same time. If the lower limit of Conditional Expression (10) is not satisfied, the negative refractive power of the negative lens L21 is too weak, which makes it difficult for the zoom lens to achieve a wide angle of view and reduction in size and weight.

It is more preferable when Conditional Expression (10) is set as follows:

$$-2.5<f21/r2<-0.25. \tag{10a}$$

It is even more preferable when Conditional Expression (10a) is set as follows:

$$-2.0<f21/r2<-0.30. \tag{10b}$$

It is even more preferable when Conditional Expression (10b) is set as follows:

$$-0.94<f21/r2<-0.50. \tag{10c}$$

It is even more preferable when Conditional Expression (10c) is set as follows:

$$-0.93<f21/r2<-0.78. \tag{10d}$$

It is preferable that the zoom lens of the second aspect of the present invention further satisfy at least one of the following conditions.

The zoom lens according to the second aspect of the present invention preferably satisfies the following condition:

$$7.0 < \beta 2t/\beta 2w < 125.0, \quad (11)$$

where β2w is the lateral magnifications of the second lens unit U2 at the wide angle end, and β2t is the lateral magnifications of the second lens unit U2 at the telephoto end. Conditional Expression (11) defines the zoom share to be borne by the second lens unit U2 when the zoom lens of the present invention zooms from the wide angle end to the telephoto end. By satisfying Conditional Expression (11), the zoom lens can achieve reduction in size and weight and a high magnification efficiently. If the upper limit of Conditional Expression (11) is not satisfied, the zoom stroke and the power of the second lens unit U2 for achieving the zoom ratio to be attained by the second lens unit U2 are too high, which makes it difficult for the zoom lens to achieve reduction in size and weight and high performance. If the lower limit of Conditional Expression (11) is not satisfied, the zoom ratio attained by the second lens unit U2 is too small, which makes it difficult for the zoom lens to achieve a high magnification and a wide angle of view.

It is more preferable when Conditional Expression (11) is set as follows:

$$7.0 < \beta 2t/\beta 2w < 100.0, \quad (11a)$$

It is more preferable when Conditional Expression (11a) is set as follows:

$$8.5 < \beta 2t/\beta 2w < 80.0. \quad (11b)$$

It is even more preferable when Conditional Expression (11b) is set as follows:

$$9.0 < \beta 2t/\beta 2w < 75.0. \quad (11c)$$

It is even more preferable when Conditional Expression (11c) is set as follows:

$$19.0 < \beta 2t/\beta 2w < 65.0. \quad (11d)$$

Further, when the third lens unit U3 having a negative refractive power is split into the 3-1 sub-lens unit U31 and the 3-2 sub-lens unit U32, the zoom lens according to the second aspect of the present invention preferably satisfies the following conditional expression:

$$-0.3 < f31/f32 < -3.4, \quad (12)$$

where f31 is the focal length of the 3-1 sub-lens unit U31, and f32 is the focal length of the 3-2 sub-lens unit U32.

The zoom lens according to the second aspect of the present invention has, as the second lens unit U2 and the third lens unit U3, lens units both having a negative refractive power and disposed next to each other. Thus, the power of the third lens unit U3 is relatively weaker than that in the first aspect. When splitting such a third lens unit, it is unnecessary to split the focal length with the same sign to strengthen them, but rather, it is advantageous in terms of achieving high performance to split the focal length with different signs to make the split parts responsible for correcting respective aberrations such as chromatic aberration. If the upper and lower limits of Conditional Expression (12) are not satisfied, the powers of the 3-1 sub-lens unit U31 and the 3-2 sub-lens unit U32 are unbalanced, which makes it difficult for the zoom lens to achieve reduction in size and weight and to produce the aberration correction capability sufficiently.

It is more preferable when Conditional Expression (12) is set as follows:

$$-0.35 < f31/f32 < -3.0. \quad (12a)$$

It is more preferable when Conditional Expression (12a) is set as follows:

$$-0.4 < f31/f32 < -2.5. \quad (12b)$$

It is more preferable when Conditional Expression (12b) is set as follows:

$$-0.5 < f31/f32 < -1.8. \quad (12c)$$

Further, the zoom lens according to the first and second aspect of the present invention preferably satisfy at least one of the following conditional expressions:

$$0.4 < (r1+r2)/(r1-r2) < 0.97, \quad (13)$$

$$1.75 < N21 < 2.30, \quad (14)$$

$$18 < \nu 21 < 50, \quad (15)$$

$$1.7 < N2p < 2.1, \text{ and} \quad (16)$$

$$16 < \nu 2p < 30, \quad (17)$$

where r1 is the radius of curvature of the object-side lens surface of the negative lens L21, r2 is the radius of curvature of the image-side lens surface of the negative lens L21, N21 and ν21 are the refractive index and the Abbe number, respectively, of the material forming the negative lens L21, and N2p and ν2p are the refractive index and the Abbe number, respectively, of the material forming a 2p lens which has a positive refractive power and is included in the second lens unit U2.

Conditional Expressions (13) to (15) define the shape and material of the negative lens L21 optimal for the zoom lens to achieve a wider angle of view, a higher magnification, and reduction in size and weight while offering favorable optical performance.

Conditional Expression (13) defines the ideal configuration of the negative lens L21 for shifting the principal point of the second lens unit U2 in the zoom lens of the present invention. When the zoom lens satisfies Conditional Expression (13), the negative lens L21 can be given an appropriate refractive power easily, which makes it possible for the zoom lens to achieve a wide angle of view and a high magnification at the same time while having favorable optical performance, and also, to achieve reduction in size and weight efficiently. If the upper limit of Conditional Expression (13) is not satisfied, the radius of curvature of the object-side lens surface of the negative lens L21 is a small positive value, which makes it difficult for the negative lens L21 to have an appropriate refractive power and thus difficult for the zoom lens to achieve a wide angle of view and reduction in size and weight. If the lower limit of Conditional Expression (13) is not satisfied, the radius of curvature of the object-side lens surface of the negative lens L21 is a small negative value, which makes it difficult for the zoom lens to achieve reduction in size and weight because of an increase in an air interval necessary to avoid interference with the first lens unit U1 at the lens's outer diameter portion.

It is more preferable when Conditional Expression (13) is set as follows:

$$0.5 < (r1+r2)/(r1-r2) < 0.94. \quad (13a)$$

It is even more preferable when Conditional Expression (13a) is set as follows:

$$0.6<(r1+r2)/(r1-r2)<0.92. \quad (13b)$$

It is even more preferable when Conditional Expression (13b) is set as follows:

$$0.65<(r1+r2)/(r1-r2)<0.88. \quad (13c)$$

Conditional Expressions (14) and (15) define the refractive index and the Abbe number, respectively, of the material forming the negative lens L21. By satisfying Conditional Expression (14), the negative lens L21 can have an appropriate refractive power, an appropriate shape, and the capability to correct chromatic aberration, which makes it possible for the zoom lens to achieve a wide angle of view, a high magnification, and reduction in size and weight while having high optical performance. If the upper limit of Conditional Expression (14) is not satisfied, it is difficult to acquire a material that effectively corrects chromatic aberration in the second lens unit U2, and thus it is difficult to correct chromatic aberration when the magnification of the zoom lens is increased. If the lower limit of Conditional Expression (14) is not satisfied, it is difficult for the negative lens L21 to have an appropriate refractive power, and thus it is difficult for the zoom lens to achieve a wide angle of view and reduction in size and weight.

It is more preferable when Conditional Expression (14) is set as follows:

$$0.8<N21<2.2. \quad (14a)$$

It is even more preferable when Conditional Expression (14a) is set as follows:

$$1.85<N21<2.15. \quad (14b)$$

If the upper limit of Conditional Expression (15) is not satisfied, it is difficult for the negative lens L21 to have an appropriate refractive power, and thus it is difficult to shift the principal point of the second lens unit U2 to the object side. Conversely, if the lower limit of Conditional Expression (15) is not satisfied, the curvature of the lens surface is strong for correction of chromatic aberration, which makes reduction in size and weight difficult.

It is more preferable when Conditional Expression (15) is set as follows:

$$21<v21<45. \quad (15a)$$

It is even more preferable when Conditional Expression (15a) is set as follows:

$$23<v21<43. \quad (15b)$$

Conditional Expressions (16) and (17) relate to the material of the 2p lens having a positive refractive power in the second lens unit U2, the material being optimal for the zoom lens to achieve a wide angle of view, a high magnification, and reduction in size and weight while having favorable optical performance. If the second lens unit U2 has more than one lens having a positive refractive power, one of them or both of them are handled as the 2p lens.

Conditional Expressions (16) and (17) define the refractive index and the Abbe number, respectively, of the material forming the 2p lens in the second lens unit U2 of the zoom lens of the present invention. When Conditional Expressions (16) and (17) are satisfied, the refractive power, shape, and chromatic aberration correction capability of the 2p lens can be appropriately set. Thus, the zoom lens can efficiently achieve a wide angle of view and a high magnification at the same time and also reduction in size and weight.

If the upper limit of Conditional Expression (16) is not satisfied, the 2p lens has too strong a refractive power, and the refractive power of the negative lens has to be increased so that the second lens unit U2 may have an appropriate negative refractive power. Thus, the curvature of the lens surface is increased, which makes lens size reduction difficult. If the lower limit of Conditional Expression (16) is not satisfied, it is difficult for the 2p lens to have both an appropriate refractive power and an appropriate capability of chromatic correction, and thus it is difficult for the lens to achieve a high magnification and reduction in size and weight.

It is more preferable when Conditional Expression (16) is set as follows:

$$1.75<N2p<2.00. \quad (16a)$$

It is even more preferable when Conditional Expression (16a) is set as follows:

$$1.77<N2p<1.98. \quad (16b)$$

If the upper limit of Conditional Expression (17) is not satisfied, it is difficult for the 2p lens to have a sufficient capability of chromatic correction, and thus it is difficult to achieve reduction in size and weight. If the lower limit of Conditional Expression (17) is not satisfied, the curvature of the lens surface is increased for correction of chromatic aberration and thus it is difficult to achieve reduction in size and weight.

It is more preferable when Conditional Expression (17) is set as follows:

$$16.5<v2p<27. \quad (17a)$$

It is even more preferable when Conditional Expression (17a) is set as follows:

$$17<v2p<25. \quad (17b)$$

An image pickup apparatus of the present invention includes a zoom lens of any of the embodiments and a solid-state image pickup element having a predetermined effective image pickup range to receive an optical image formed by the zoom lens.

The zoom lens preferably satisfies the following conditional expressions:

$$18<ft/fw<150, \text{ and} \quad (18)$$

$$57.8<2\omega w<72.6, \quad (19)$$

where ωw is a half angle of view of the zoom lens at the wide angle end, fw is the focal length of the zoom lens at the wide angle end, and ft is the focal length of the zoom lens at the telephoto end.

Conditional Expressions (18) and (19) define the ranges of the zoom lens's magnification and angle of view at the wide angle end suitable for producing the advantageous effects offered by the present invention. If Conditional Expressions (18) and (19) are not met, there is a possibility that appropriate lens configurations and power arrangements for achieving desired specifications are not selected for the zoom lens.

It is more preferable when Conditional Expression (18) is set as follows:

$$21<ft/fw<140. \quad (18a)$$

It is even more preferable when Conditional Expression (18a) is set as follows:

$$29<ft/fw<135. \quad (18b)$$

It is more preferable when Conditional Expression (19) is set as follows:

$$61.3 < 2\omega w < 71.1. \quad (19a)$$

It is more preferable when Conditional Expression (19a) is set as follows:

$$61.7 < 2\omega w < 70.8. \quad (19b)$$

The image pickup apparatus of the present invention is characterized by including a zoom lens of any of the embodiments and a solid-state image pickup element having a predetermined effective image pickup range to receive an optical image formed by the zoom lens.

Specific configurations of the zoom lens of the present invention are described based on the characteristics of the lens configurations of Numeral Value Embodiments 1 to 5 corresponding to Embodiments 1 to 5.

Embodiment 1

FIG. 1 is a lens sectional diagram of a zoom lens of Embodiment 1 (Numerical Embodiment 1) of the present invention focused on an object at infinity at a wide angle end (a focal length of 8.5 mm). FIGS. 2A, 2B, and 2C are longitudinal aberration diagrams of the zoom lens of Numerical Embodiment 1 focused on an object at infinity at the wide angle end (a focal length of 8.5 mm), at the zoom middle position (a focal length of 100 mm), and at the telephoto end (a focal length of 1020 mm), respectively. The focal lengths are values in the numerical embodiment to be described later expressed in millimeters. The same is true to the following numerical embodiments.

In FIG. 1, the zoom lens of Embodiment 1 includes, in order from the object side, a first lens unit U1 for focusing having a positive refractive power, a second lens unit U2 for zooming having a negative refractive power configured to be moved from the object side to the image side for zooming from the wide angle end to the telephoto end, a third lens unit U3 for zooming having a positive refractive power configured to be moved from the image side to the object side for zooming from the wide angle end to the telephoto end, and a positive fourth lens unit U4 for image formation. The third lens unit U3 consists of a 3-1 sub-lens unit U31 having a positive refractive power and a 3-2 sub-lens unit U32 having a positive refractive power. In Embodiment 1, the second lens unit U2 and the third lens unit U3 form the zooming system. SP denotes an aperture stop disposed between the third lens unit U3 and the fourth lens unit U4. IP denotes an image plane. When the zoom lens is used as an image pickup optical system for a broadcasting television camera, a video camera, or a digital still camera, the image plane IP corresponds to, for example, the image pickup plane of a solid-state image pickup element (photo-electric conversion element) that receives an optical image formed by the zoom lens and performs photo-electric conversion. When the zoom lens is used as an image pickup optical system for a film camera, the image plane corresponds to the film plane sensitive to an optical image formed by the zoom lens.

In the section for spherical aberration in the longitudinal aberration diagrams, the solid line and the dot-dot-dash line denote e-line and g-line, respectively. In the section for astigmatism, the dotted line and the solid line denote the meridional image plane and the sagittal image plane, respectively. In the section for chromatic aberration of magnification, the dot-dot-dash line denotes g-line. Further, ω denotes a half angle of view, and Fno denotes an f-number. In each longitudinal aberration diagram, spherical aberration is depicted on a scale of ±0.4 mm; astigmatism, on a scale of ±0.4 mm; distortion, on a scale of ±10%; and chromatic aberration of magnification, on a scale of ±0.1 mm. Note that in the following embodiments, the wide angle end and the telephoto end refer to zoom positions which are available ends of the zoom range in which the second lens unit U2 for zooming can move on the optical axis mechanically.

Next, descriptions are given of correspondences between the lens units and the surface data of Numerical Embodiment 1. The first lens unit U1 corresponds to the 1st to 12th surfaces. The first lens unit U1 consists of an 11 lens unit U11 having a negative refractive power configured not to be moved for focusing and a 12 lens unit U12 having a positive refractive power configured to be moved from the image side to the object side for focusing from infinity to close-up. The 11 lens unit U11 corresponds to the 1st to 6th surfaces, and the 12 lens unit U12 corresponds to the 7th to 12th surfaces. The 12 lens unit U12 may employ what is called a floating focus to be able to improve aberration variation during focus driving by causing a part of the 12 lens unit U12 to take a different path for focus driving. The second lens unit U2 corresponds to the 13th to 19th surfaces. In Embodiment 1, the negative lens L21 corresponds to the 13th and 14th surfaces. The third lens unit U3 corresponds to the 20th to 30th surfaces. In the third lens unit U3, the 3-1 sub-lens unit U31 corresponds to the 20th to 25th surfaces, and the 3-2 sub-lens unit U32 corresponds to the 26th to 30th surfaces. The apertures stop corresponds to the 31st surface. The fourth lens unit U4 corresponds to the 32nd to 53rd surfaces. The 54th to 56th surfaces correspond to a dummy glass which is, for example, a color separation optical system.

The second lens unit U2 consists of four lenses made of a glass material. The second lens unit U2 consists of, in order from the object side to the image side, a biconcave negative lens L21 having a negative refractive power, a cemented lens formed by a biconcave 22 lens L22 having a negative refractive power and a biconvex 23 lens L23 having a positive refractive power, and a meniscus 24 lens having a negative refractive power and having a convex surface facing the image side. The object-side lens surface of the negative lens L21 is concave, which advantageously shifts the object-side principal point of the lens to the object side to reduce size and weight. Further, the object-side lens surface of the negative lens L21 is aspheric, which helps reduce aberrations such as distortion and field curvature which tend to be increased by widening of the angle of view. Although the 22 lens L22 having a negative refractive power and the 23 lens L23 having a positive refractive power are cemented together in Embodiment 1, they may be not cemented but separated as long as they provide an appropriate refractive power and capability of correcting chromatic aberration as the second lens unit U2. The second lens unit U2 in Embodiment 1 is not split into sub units that take different paths for zooming. Instead, in order to correct aberration variation at the zoom middle position, the second lens unit U2 may consist of two sub-lens units, namely the 21 sub-lens unit U21 and the 22 sub-lens unit U22, that satisfy Conditional Expression (2) described above and move slightly different paths. Such modes are within the present invention's conceivable scope of modifications and changes of the lens shape and configuration, and applies to all of the following embodiments as well.

A description is given of Numerical Embodiment 1 corresponding to Embodiment 1. Not only in Numerical Embodiment 1 but also in all the numerical embodiments, i indicates the ordinal number of a surface (optical surface) from the object side; ri, the radius of curvature of the i-th surface from the object side; di, the distance (on the optical axis) between the i-th surface and the (i+1)-th surface from the object side; ndi, νdi, and θgFi, the refractive index, the Abbe number, and the partial dispersion ratio, respectively, of a medium (optical member) between the i-th surface and the (i+1)-th surface from the object side; and BF, a back focal length in air. Herein, the focal length of a lens is a value at the wavelength of the e-line. A surface with 0.000 written as its focal length indicates that the surface is without power. With an X axis being the optical-axis direction, an H axis being perpendicular to the optical axis, a light travelling direction being positive, R being a paraxial curvature radius, k being a conic constant, and A3 to A16 each being an aspherical coefficient, an aspherical shape is expressed as follows. Note that e-Z in aspherical surface data indicates ×10$^{-Z}$.

$$X = \frac{H^2/R}{1 + \sqrt{1-(1+k)(H/R)^2}} + A4H^4 + A6H^6 +$$
$$A8H^8 + A10H^{10} + A12H^{12} + A14H^{14} + A16H^{16} + A3H^3 +$$
$$A5H^5 + A7H^7 + A9H^9 + A11H^{11} + A13H^{13} + A15H^{15}$$

Table 1 shows values corresponding to the conditional expressions of Embodiment 1. Embodiment 1 satisfies Expressions (3) to (7) and (13) to (19) to appropriately set the lens configuration, refractive power, and glass material of the second lens unit in particular. Thereby, the zoom lens of Embodiment 1 achieves a wide angle of view, a high zoom ratio, reduction in size and weight, and high optical performance over the entire zoom range. It should be noted that the zoom lens of the present invention has to satisfy Expressions (3) to (6), but does not necessarily have to satisfy Expressions (7) and (13) to (19). However, better effects can be produced when at least one of Expressions (7) and (13) to (19) is additionally satisfied. This is true to Embodiment 2 as well.

FIG. 11 is a schematic diagram illustrating an image pickup apparatus (television camera system) using the zoom lens of any of the embodiments as its imaging optical system. In FIG. 11, reference numeral 101 denotes the zoom lens of any one of Embodiments 1 to 5; 201, a camera to and from which the zoom lens 101 is attachable and detachable; and 301, an image pickup apparatus formed by attachment of the zoom lens 101 to the camera 201. The zoom lens 101 has a first lens unit F, a zooming part V, and a rear lens group R for image formation. The first lens unit F includes a lens unit for focusing. The zooming part V includes second and third lens units configured to be moved on the optical axis for zooming. SP denotes an aperture stop. 102 and 103 are driving mechanisms, such as a helicoid or a cam, to drive the first lens unit F and the zooming part V, respectively, in the optical-axis direction. 105, 106, and 107 are motors (driving means) to electrically drive the driving mechanism 102, the driving mechanism 103, and the aperture stop SP, respectively. 109, 110, and 111 are detectors, such as an encoder, a potentiometer, or a photosensor, to detect the positions of the first lens unit F and the zooming part V on the optical axis and the aperture diameter of the aperture stop SP. In the camera 201, 202 denotes a glass block equivalent to an optical filter or a color separation optical system in the camera 201, and 203 denotes a solid-state image pickup element (photo-electric conversion element) such as a CCD or CMOS sensor to receive a subject image formed by the zoom lens 101. Further, 204 and 113 are CPUs to control the driving of various parts of the camera 201 and the zoom lens 101.

An image pickup apparatus with high optical performance can be obtained when the zoom lens of the present invention is thus applied to a television camera.

Embodiment 2

FIG. 3 is a lens sectional diagram of a zoom lens of Embodiment 2 (Numerical Embodiment 2) of the present invention focused on an object at infinity at a wide angle end (a focal length of 8.8 mm). FIGS. 4A, 4B, and 4C are longitudinal aberration diagrams of the zoom lens of Numerical Embodiment 2 focused on an object at infinity at the wide angle end (a focal length of 8.8 mm), at the zoom middle position (a focal length of 100 mm), and at the telephoto end (a focal length of 1020.8 mm), respectively.

In FIG. 3, the zoom lens of Embodiment 2 includes, in order from the object side, a first lens unit U1 for focusing having a positive refractive power, a second lens unit U2 for zooming having a negative refractive power configured to be moved from the object side to the image side for zooming from the wide angle end to the telephoto end, a third lens unit U3 having a positive refractive power configured to be moved for zooming from the wide angle end to the telephoto end, and a positive fourth lens unit U4 for image formation. The second lens unit U2 consists of a 2-1 sub-lens unit U21 having a negative refractive power and a 2-2 sub-lens unit U22 having a negative refractive power. The third lens unit U3 consists of a 3-1 sub-lens unit U31 having a positive refractive power and a 3-2 sub-lens unit U32 having a positive refractive power. In Embodiment 2, the second lens unit U2 and the third lens unit U3 form the zooming system. SP denotes an aperture stop disposed between the third lens unit U3 and the fourth lens unit U4.

Next, descriptions are given of correspondences between the lens units and the surface data of Numerical Embodiment 2. The first lens unit U1 corresponds to the 1st to 14th surfaces. The first lens unit U1 consists of an 11 lens unit U1f having a negative refractive power configured not to be moved for focusing, a 12 lens unit U12 having a positive refractive power configured to be moved from the image side to the object side for focusing from infinity to close-up, and a 13 lens unit U13 having a positive refractive power configured to be moved from the image side to the object side for focusing from infinity to close-up. The 11 lens unit U11 corresponds to the 1st to 6th surfaces, the 12 lens unit U12 corresponds to the 7th to 12th surfaces, and the 13 lens unit U13 corresponds to the 13th and 14th surfaces. The second lens unit U2 corresponds to the 15th to 21st surfaces. In the second lens unit U2, the 2-1 sub-lens unit U21 corresponds to the 15th and 16th surfaces, and the 2-2 sub-lens unit U22 corresponds to the 17th to 21st surfaces. In Embodiment 2, the negative lens L21 corresponds to the 15th and 16th surfaces. The third lens unit U3 corresponds to the 22nd to 32nd surfaces. In the third lens unit U3, the 3-1 sub-lens unit U31 corresponds to the 22nd and 23rd surfaces, and the 3-2 sub-lens unit U32 corresponds to the 24th to 32nd surfaces. The apertures stop corresponds to the 33rd surface. The fourth lens unit U4 corresponds to the 34th to 55th surfaces. The 56th to 58th surfaces correspond to a dummy glass which is, for example, a color separation optical system.

Table 1 shows values corresponding to the conditional expressions of Embodiment 2. Embodiment 2 satisfies Expressions (3) to (7) and (13) to (19) to appropriately set the lens configuration, refractive power, and glass material of the second lens unit in particular. Thereby, the zoom lens of Embodiment 2 achieves a wide angle of view, a high zoom ratio, reduction in size and weight, and high optical performance over the entire zoom range.

Embodiment 3

FIG. 5 is a lens sectional diagram of a zoom lens of Embodiment 3 (Numerical Embodiment 3) of the present invention focused on an object at infinity at a wide angle end (a focal length of 9.5 mm). FIGS. 6A, 6B, and 6C are longitudinal aberration diagrams of the zoom lens of Numerical Embodiment 3 focused on an object at infinity at the wide angle end (a focal length of 9.5 mm), at the zoom middle position (a focal length of 40 mm), and at the telephoto end (a focal length of 437 mm), respectively.

In FIG. 5, the zoom lens of Embodiment 3 includes, in order from the object side, a first lens unit U1 for focusing having a positive refractive power, a second lens unit U2 for zooming having a negative refractive power configured to be moved from the object side to the image side for zooming from the wide angle end to the telephoto end, a third lens unit U3 having a negative refractive power configured to be moved non-linearly on the optical axis for zooming, and a positive fourth lens unit U4 for image formation. The second lens unit U2 consists of a 21 sub-lens unit U21 having a negative refractive power and a 22 sub-lens unit U22 having a positive refractive power. In Embodiment 3, the second lens unit U2 and the third lens unit U3 form the zooming system. SP denotes an aperture stop disposed between the third lens unit U3 and the fourth lens unit U4.

Next, descriptions are given of correspondences between the lens units and the surface data of Numerical Embodiment 3. The first lens unit U1 corresponds to the 1st to 10th surfaces. The first lens unit U1 consists of an 11 lens unit U11 having a negative refractive power configured not to be moved for focusing and a 12 lens unit U12 having a positive refractive power configured to be moved from the image side to the object side for focusing from infinity to close-up. The 11 lens unit U11 corresponds to the 1st to 4th surfaces, and the 12 lens unit U12 corresponds to the 5th to 10th surfaces. The second lens unit U2 corresponds to the 11th to 19th surfaces. In the second lens unit U2, the 2-1 sub-lens unit U21 corresponds to the 11th to 15th surfaces, and the 2-2 sub-lens unit U22 corresponds to the 16th to 19th surfaces. In Embodiment 3, the negative lens L21 corresponds to the 11th and 12th surfaces. The third lens unit U3 corresponds to the 20th to 22nd surfaces. The apertures stop corresponds to the 23rd surface. The fourth lens unit U4 corresponds to the 24th to 44th surfaces. The 45th to 47th surfaces correspond to a dummy glass which is, for example, a color separation optical system.

Table 1 shows values corresponding to the conditional expressions of Embodiment 3. Embodiment 3 satisfies Expressions (8) to (11) and (13) to (19) to appropriately set the lens configuration, refractive power, and glass material of the second lens unit in particular. Thereby, the zoom lens of Embodiment 1 achieves a wide angle of view, a high zoom ratio, reduction in size and weight, and high optical performance over the entire zoom range. It should be noted that the zoom lens of the present invention has to satisfy Expressions (8) to (10), but does not necessarily have to satisfy Expressions (11) and (13) to (19). However, better effects can be produced when at least one of Expressions (11) and (13) to (19) is additionally satisfied.

Embodiment 4

FIG. 7 is a lens sectional diagram of a zoom lens of Embodiment 4 (Numerical Embodiment 4) of the present invention focused on an object at infinity at a wide angle end (a focal length of 9.3 mm). FIGS. 8A, 8B, and 8C are longitudinal aberration diagrams of the zoom lens of Numerical Embodiment 4 focused on an object at infinity at the wide angle end (a focal length of 9.3 mm), at the zoom middle position (a focal length of 35 mm), and at the telephoto end (a focal length of 446.4 mm), respectively.

In FIG. 7, the zoom lens of Embodiment 4 includes, in order from the object side, a first lens unit U1 for focusing having a positive refractive power, a second lens unit U2 for zooming having a negative refractive power configured to be moved from the object side to the image side for zooming from the wide angle end to the telephoto end, a third lens unit U3 configured to be moved non-linearly on the optical axis for zooming, and a positive fourth lens unit U4 for image formation. The second lens unit U2 consists of a 2-1 sub-lens unit U21 having a negative refractive power and a 2-2 sub-lens unit U22 having a negative refractive power. The third lens unit U3 consists of a 3-1 sub-lens unit U31 having a negative refractive power and configured to be moved non-linearly on the optical axis for zooming, and a 3-2 sub-lens unit U32 having a positive refractive power and configured to be moved non-linearly on the optical axis for zooming. In Embodiment 4, the second lens unit U2 and the third lens unit U3 form the zooming system. SP denotes an aperture stop disposed between the third lens unit U3 and the fourth lens unit U4.

Next, descriptions are given of correspondences between the lens units and the surface data of Numerical Embodiment 4. The first lens unit U1 corresponds to the 1st to 10th surfaces. The first lens unit U1 consists of an 11 lens unit U11 having a positive refractive power configured not to be moved for focusing and a 12 lens unit U12 having a positive refractive power configured to be moved from the image side to the object side for focusing from infinity to close-up. The 11 lens unit U11 corresponds to the 1st to 4th surfaces, and the 12 lens unit U12 corresponds to the 5th to 10th surfaces. The second lens unit U2 corresponds to the 11th to 18th surfaces. In the second lens unit U2, the 21 sub-lens unit U21 corresponds to the 11th to 16th surfaces, and the 2-2 sub-lens unit U22 corresponds to the 17th and 18th surfaces. In Embodiment 4, the negative lens L21 corresponds to the 11th and 12th surfaces and is aspheric on both surfaces. The 3-1 sub-lens unit U31 corresponds to the 19th to 21st surfaces. The 3-2 sub-lens unit U32 corresponds to the 22nd to 25th surfaces. The apertures stop corresponds to the 26th surface. The fourth lens unit U4 corresponds to the 27th to 42nd surfaces. The 43rd to 45th surfaces correspond to a dummy glass which is, for example, a color separation optical system.

Table 1 shows values corresponding to the conditional expressions of Embodiment 4. Embodiment 4 satisfies Expressions (8) to (19) to appropriately set the lens configuration, refractive power, and glass material of the second lens unit in particular. Thereby, the zoom lens of Embodiment 4 achieves a wide angle of view, a high zoom ratio, reduction in size and weight, and high optical performance over the entire zoom range. It should be noted that the zoom lens of the present invention has to satisfy Expressions (8) to (10), but does not necessarily have to satisfy Expressions

(11) to (19). However, better effects can be produced when at least one of Expressions (11) to (19) is additionally satisfied.

Embodiment 5

FIG. 9 is a lens sectional diagram of a zoom lens of Embodiment 5 (Numerical Embodiment 5) of the present invention focused on an object at infinity at a wide angle end (a focal length of 8.0 mm). FIGS. 10A, 10B, and 10C are longitudinal aberration diagrams of the zoom lens of Numerical Embodiment 5 focused on an object at infinity at the wide angle end (a focal length of 8.0 mm), at the zoom middle position (a focal length of 61.9 mm), and at the telephoto end (a focal length of 880.0 mm), respectively.

In FIG. 9, the zoom lens of Embodiment 5 includes, in order from the object side, a first lens unit U1 for focusing having a positive refractive power, a second lens unit U2 for zooming having a negative refractive power configured to be moved from the object side to the image side for zooming from the wide angle end to the telephoto end, a third lens unit U3 having a positive refractive power configured to be moved for zooming from the wide angle end to the telephoto end, and a positive fourth lens unit U4 for image formation. The third lens unit U3 consists of a 3-1 sub-lens unit U31 having a positive refractive power and a 3-2 sub-lens unit U32 having a positive refractive power. In Embodiment 5, the second lens unit U2 and the third lens unit U3 form the zooming system. SP denotes an aperture stop disposed between the third lens unit U3 and the fourth lens unit U4.

Next, descriptions are given of correspondences between the lens units and the surface data of Numerical Embodiment 5. The first lens unit U1 corresponds to the 1st to 12th surfaces. The first lens unit U1 consists of an 11 lens unit U11 having a negative refractive power configured not to be moved for focusing and a 12 lens unit U12 having a positive refractive power configured to be moved from the image side to the object side for focusing from infinity to close-up. The 11 lens unit U11 corresponds to the 1st to 6th surfaces, and the 12 lens unit U12 corresponds to the 7th to 12th surfaces. The second lens unit U2 corresponds to the 13th to 22nd surfaces. In Embodiment 5, the negative lens L21 corresponds to the 15th and 16th surfaces, and has an aspheric surface r1 on the object side. The third lens unit U3 corresponds to the 22nd to 31st surfaces. In the third lens unit U3, the 3-1 sub-lens unit U31 corresponds to the 23rd and 24th surfaces, and the 3-2 sub-lens unit U32 corresponds to the 25th to 31st surfaces. The apertures stop corresponds to the 32nd surface. The fourth lens unit U4 corresponds to the 33rd to 55th surfaces. The 56th to 58th surfaces correspond to a dummy glass which is, for example, a color separation optical system.

Table 1 shows values corresponding to the conditional expressions of Embodiment 5. Embodiment 5 satisfies Expressions (3) to (7) and (14) to (19) to appropriately set the lens configuration, refractive power, and glass material of the second lens unit in particular. Thereby, the zoom lens of Embodiment 5 achieves a wide angle of view, a high zoom ratio, reduction in size and weight, and high optical performance over the entire zoom range.

Although the preferred embodiments of the present invention have been described above, the present invention is not limited to those embodiments and is variously modifiable and changeable within the gist thereof.

Numerical Embodiment 1

[Unit mm]
Surface data

| Surface number | r | d | nd | vd | θgF | Focal length |
|---|---|---|---|---|---|---|
| 1 | −2942.1881 | 6.00000 | 1.834810 | 42.74 | 0.5648 | −358.417 |
| 2 | 335.45859 | 1.80000 | | | | |
| 3 | 335.06633 | 23.70767 | 1.433870 | 95.10 | 0.5373 | 588.078 |
| 4 | −1057.92901 | 0.20000 | | | | |
| 5 | 525.29863 | 14.685252 | 1.433870 | 95.10 | 0.5373 | 995.955 |
| 6 | −2449.90453 | 25.25075 | | | | |
| 7 | 377.04224 | 20.53079 | 1.433870 | 95.10 | 0.5373 | 681.715 |
| 8 | −1365.49684 | 0.25000 | | | | |
| 9 | 306.95406 | 16.15620 | 1.433870 | 95.10 | 0.5373 | 856.440 |
| 10 | 1716.23164 | 1.49946 | | | | |
| 11 | 188.24393 | 16.19337 | 1.438750 | 94.66 | 0.5340 | 776.951 |
| 12 | 408.07756 | (variable) | | | | |
| 13 | −532.82374 | 2.20000 | 2.003300 | 28.27 | 0.5980 | −35.106 |
| 14 | 38.13165 | 11.72245 | | | | |
| 15 | −44.54614 | 1.45000 | 1.743198 | 49.34 | 0.5531 | −36.767 |
| 16 | 72.56546 | 9.77415 | 1.892860 | 20.36 | 0.6393 | 32.645 |
| 17 | −46.48441 | 1.62858 | | | | |
| 18 | −41.75805 | 2.00000 | 1.882997 | 40.76 | 0.5667 | −65.283 |
| 19 | −152.60813 | (variable) | | | | |
| 20 | 152.33559 | 11.49260 | 1.729157 | 54.68 | 0.5444 | 133.769 |
| 21 | −265.71450 | 6.61910 | | | | |
| 22 | 139.88768 | 13.50202 | 1.438750 | 94.66 | 0.5340 | 205.022 |
| 23 | −246.30392 | 0.49825 | | | | |
| 24 | 264.09410 | 2.60000 | 1.854780 | 24.80 | 0.6122 | −179.267 |
| 25 | 97.10593 | (variable) | | | | |
| 26 | 86.50601 | 15.38886 | 1.496999 | 81.54 | 0.5375 | 129.181 |
| 27 | −236.96933 | 0.50000 | | | | |
| 28 | 415.87662 | 2.50000 | 1.805181 | 25.42 | 0.6161 | −258.974 |
| 29 | 139.36202 | 7.84908 | 1.603112 | 60.64 | 0.5415 | 195.306 |
| 30 | −764.20052 | (variable) | | | | |
| 31 | (stop) | 5.45833 | | | | |
| 32 | −100.58829 | 1.40000 | 1.882997 | 40.76 | 0.5667 | −37.583 |

-continued

| | | | | | | |
|---|---|---|---|---|---|---|
| 33 | 50.28488 | 1.36347 | | | | |
| 34 | 40.81657 | 3.59528 | 1.922860 | 18.90 | 0.6495 | 73.660 |
| 35 | 96.04198 | 4.18687 | | | | |
| 36 | −79.86582 | 1.70000 | 1.804000 | 46.53 | 0.5577 | −334.481 |
| 37 | −114.43939 | 7.69473 | | | | |
| 38 | 447.23261 | 1.50000 | 1.804000 | 46.53 | 0.5577 | −48.910 |
| 39 | 36.26082 | 4.29014 | 1.846660 | 23.87 | 0.6205 | 54.487 |
| 40 | 154.67305 | 4.70815 | | | | |
| 41 | −40.89612 | 1.50000 | 1.891900 | 37.13 | 0.5780 | −32.225 |
| 42 | 100.53116 | 8.12196 | 1.516330 | 64.14 | 0.5353 | 45.339 |
| 43 | −29.81855 | 12.96157 | | | | |
| 44 | 95.10916 | 5.83122 | 1.517417 | 52.43 | 0.5564 | 75.782 |
| 45 | −65.82347 | 1.39999 | | | | |
| 46 | −142.70016 | 1.50000 | 1.882997 | 40.76 | 0.5667 | −33.622 |
| 47 | 37.95063 | 7.64407 | 1.487490 | 70.23 | 0.5300 | 54.962 |
| 48 | −86.09780 | 0.20000 | | | | |
| 49 | 111.79843 | 7.62511 | 1.517417 | 52.43 | 0.5564 | 52.636 |
| 50 | −35.37773 | 1.50000 | 1.882997 | 40.76 | 0.5667 | −59.834 |
| 51 | −107.94732 | 0.20000 | | | | |
| 52 | 90.09429 | 7.67048 | 1.539956 | 59.46 | 0.5441 | 63.279 |
| 53 | −53.74072 | 10.00000 | | | | |
| 54 | ∞ | 33.00000 | 1.608590 | 46.44 | 0.5664 | 0.0000 |
| 55 | ∞ | 13.20000 | 1.516330 | 64.15 | 0.5352 | 0.0000 |
| 56 | ∞ | 13.30000 | | | | |
| Image plane | ∞ | | | | | |

Aspheric surface data

13th surface

K = 1.99852e+000
A4 = 1.15677e−006
A6 = −2.75064e−008
A8 = −3.06848e−010
A10 = 9.10515e−013
A12 = 3.2848e−015
A14 = 1.35261e−018
A16 = 5.54400e−022
A3 = 2.74335e−007
A5 = 9.95673e−008
A7 = 4.02226e−009
A9 = 6.12079e−012
A11 = −8.52506e−014
A13 = −6.85632e−017
A15 = −3.84859e−020

21th surface

K = 1.21093e+001
A4 = 2.82183e−007
A6 = −5.59441e−011
A8 = −2.00796e−014
A10 = 9.78964e−017
A12 = −6.30815e−020
A14 = 1.70834e−023
A16 = −4.73901e−027
A3 = −2.90901e−008
A5 = 1.58196e−009
A7 = 1.10620e−012
A9 = −1.50730e−015
A11 = 5.86871e−020
A13 = 1.04584e−022
A15 = 1.44467e−025

30th surface

K = −2.23400e+002
A4 = 2.77687e−007
A6 = 4.69555e−010
A8 = 1.39733e−013
A10 = −2.98156e−016
A12 = 4.58582e−019
A14 = −2.25443e−022
A16 = 5.80568e−026
A3 = 1.70768e−007
A5 = −5.73181e−009
A7 = −1.36230e−011

-continued

A9 = 7.92918e−015
A11 = −8.14405e−018
A13 = 2.06016e−021
A15 = −8.57551e−025

Various data

| Zoom ratio | 120.00 | | |
|---|---|---|---|
| | Wide angle | Middle | Telephoto |
| Focal length | 8.50 | 100.00 | 1020.00 |
| F-number | 1.75 | 1.75 | 5.30 |
| Half angle view (deg) | 32.91 | 3.15 | 0.31 |
| Total lens length | 677.55 | 677.55 | 677.55 |
| d12 | 3.47 | 154.53 | 194.08 |
| d19 | 289.33 | 96.93 | 2.00 |
| d25 | 4.21 | 10.31 | 4.50 |
| d30 | 2.99 | 38.24 | 99.42 |
| Entrance pupil position | 133.62 | 1087.74 | 14063.25 |
| Exit pupil position | 166.67 | 166.67 | 166.67 |
| Front principal point position | 142.60 | 1252.93 | 21866.59 |
| Rear principal point position | 4.80 | 86.70 | 1006.70 |

Zoom lens unit data

| Unit | Start surface | Focal length | Lens structure length | Front principal point position | Rear principal point position |
|---|---|---|---|---|---|
| 1 | 1 | 251.50 | 126.27 | 72.69 | −19.27 |
| 2 | 13 | −24.07 | 28.78 | 3.62 | −16.98 |
| 3 | 20 | 71.71 | 65.16 | 17.97 | −32.27 |
| 3-1 | 20 | 134.62 | 34.71 | −5.03 | −27.55 |
| 3-2 | 26 | 112.37 | 26.24 | 4.27 | −13.07 |
| 4 | 31 | 42.11 | 148.25 | 58.68 | 17.53 |

Individual lens data

| Lens | Start surface | Focal length |
|---|---|---|
| 1 | 1 | −358.42 |
| 2 | 3 | 588.08 |
| 3 | 5 | 995.95 |
| 4 | 7 | 681.71 |
| 5 | 9 | 856.44 |
| 6 | 11 | 776.95 |
| 7 | 13 | −35.11 |
| 8 | 15 | −36.77 |
| 9 | 16 | 32.64 |
| 10 | 18 | −65.28 |
| 11 | 20 | 133.77 |
| 12 | 22 | 205.02 |
| 13 | 24 | −179.27 |
| 14 | 26 | 129.18 |
| 15 | 28 | −258.97 |
| 16 | 29 | 195.31 |
| 17 | 32 | −37.58 |
| 18 | 34 | 73.66 |
| 19 | 36 | −334.48 |
| 20 | 38 | −48.91 |
| 21 | 39 | 54.49 |
| 22 | 41 | −32.23 |
| 23 | 42 | 45.34 |
| 24 | 44 | 75.78 |
| 25 | 46 | −33.62 |
| 26 | 47 | 54.96 |
| 27 | 49 | 52.64 |
| 28 | 50 | −59.83 |
| 29 | 52 | 63.28 |
| 30 | 54 | 0.00 |
| 31 | 55 | 0.00 |

Numerical Embodiment 2

[Unit mm]

Surface data

| Surface number | r | d | nd | vd | θgF | Focal length |
|---|---|---|---|---|---|---|
| 1 | −1061.37564 | 6.00000 | 1.788001 | 47.37 | 0.5559 | −390.733 |
| 2 | 437.88370 | 2.00000 | | | | |
| 3 | 446.06598 | 23.92188 | 1.433870 | 95.10 | 0.5373 | 601.511 |
| 4 | −622.49493 | 0.19890 | | | | |
| 5 | 915.30360 | 6.00000 | 1.850259 | 32.27 | 0.5929 | −2140.254 |
| 6 | 608.63429 | 1.00000 | | | | |
| 7 | 471.99209 | 19.57807 | 1.433870 | 95.10 | 0.5373 | 710.692 |
| 8 | −884.56718 | 24.97986 | | | | |
| 9 | 404.12448 | 19.24764 | 1.433870 | 95.10 | 0.5373 | 735.565 |
| 10 | −1513.72254 | 0.25000 | | | | |
| 11 | 295.70647 | 15.37006 | 1.433870 | 95.10 | 0.5373 | 912.821 |
| 12 | 1140.36416 | 1.49921 | | | | |
| 13 | 176.82815 | 17.53882 | 1.438750 | 94.66 | 0.5340 | 708.678 |
| 14 | 396.25334 | (variable) | | | | |
| 15 | −265.90829 | 2.20000 | 2.003300 | 28.27 | 0.5980 | −34.459 |
| 16 | 40.28905 | (variable) | | | | |
| 17 | −48.69408 | 1.45000 | 1.743198 | 49.34 | 0.5531 | −37.052 |
| 18 | 64.90157 | 10.15625 | 1.892860 | 20.36 | 0.6393 | 31.409 |
| 19 | −46.65078 | 0.94977 | | | | |
| 20 | −43.70695 | 2.00000 | 1.882997 | 40.76 | 0.5667 | −60.575 |
| 21 | −238.00409 | (variable) | | | | |
| 22 | 245.70301 | 9.91935 | 1.729157 | 54.68 | 0.5444 | 166.130 |
| 23 | −236.88071 | (variable) | | | | |
| 24 | 103.55182 | 17.39977 | 1.438750 | 94.66 | 0.5340 | 156.020 |
| 25 | −193.03075 | 1.05104 | | | | |
| 26 | 252.55381 | 2.60000 | 1.854780 | 24.80 | 0.6122 | −196.136 |
| 27 | 100.85362 | 1.00000 | | | | |
| 28 | 95.22728 | 13.03743 | 1.496999 | 81.54 | 0.5375 | 158.218 |
| 29 | −438.07745 | 2.50000 | 1.854780 | 24.80 | 0.6122 | −276.124 |
| 30 | 523.78139 | 0.20000 | | | | |
| 31 | 180.13422 | 8.54326 | 1.603112 | 60.64 | 0.5415 | 187.177 |
| 32 | −300.14000 | (variable) | | | | |
| 33 (stop) | ∞ | 5.52545 | | | | |
| 34 | −107.41243 | 1.40000 | 1.882997 | 40.76 | 0.5667 | −42.397 |
| 35 | 58.33624 | 0.49984 | | | | |
| 36 | 40.86521 | 3.81080 | 1.922860 | 18.90 | 0.6495 | 78.513 |
| 37 | 88.11073 | 5.44329 | | | | |
| 38 | −54.21473 | 1.70000 | 1.804000 | 46.53 | 0.5577 | −226.438 |
| 39 | −78.11945 | 7.02652 | | | | |
| 40 | 93.33051 | 1.50000 | 1.804000 | 46.53 | 0.5577 | −72.878 |
| 41 | 35.84895 | 4.89868 | 1.846660 | 23.87 | 0.6205 | 73.045 |
| 42 | 78.85313 | 5.49000 | | | | |
| 43 | −54.59995 | 1.50000 | 1.891900 | 37.13 | 0.5780 | −35.855 |
| 44 | 79.40629 | 8.36701 | 1.516330 | 64.14 | 0.5353 | 44.402 |
| 45 | −31.23562 | 11.32613 | | | | |
| 46 | 336.41962 | 3.58796 | 1.517417 | 52.43 | 0.5564 | 499.848 |
| 47 | −1136.62512 | 2.00000 | | | | |
| 48 | 5113.58495 | 1.50000 | 1.882997 | 40.76 | 0.5667 | −40.183 |
| 49 | 35.43620 | 10.23202 | 1.487490 | 70.23 | 0.5300 | 53.262 |
| 50 | −89.05834 | 0.20000 | | | | |
| 51 | 81.01290 | 7.80550 | 1.517417 | 52.43 | 0.5564 | 50.353 |
| 52 | −37.38744 | 1.50000 | 1.882997 | 40.76 | 0.5667 | −65.032 |
| 53 | −108.00852 | 0.20000 | | | | |
| 54 | 98.80813 | 6.54950 | 1.539956 | 59.46 | 0.5441 | 63.248 |
| 55 | −51.28636 | 10.00000 | | | | |
| 56 | ∞ | 33.00000 | 1.608590 | 46.44 | 0.5664 | 0.0000 |
| 57 | ∞ | 13.20000 | 1.516330 | 64.15 | 0.5352 | 0.0000 |
| 58 | ∞ | 13.29000 | | | | |
| Image plane | ∞ | | | | | |

Aspheric surface data

15th surface

K = −2.00000e+000
A4 = 1.26593e−006
A6 = −2.67796e−008
A8 = −3.03007e−010
A10 = 8.75925e−013
A12 = 3.31947e−015
A14 = 1.36796e−018
A16 = 5.79644e−022
A3 = −4.12865e−007
A5 = 8.74667e−008
A7 = 3.94668e−009
A9 = 6.37487e−012
A11 = −8.43915e−014
A13 = −7.03012e−017
A15 = −3.91084e−020

23th surface

K = 1.60380e+001
A4 = 1.88802e−007
A6 = −4.95211e−011
A8 = −1.59588e−014
A10 = 9.82595e−017
A12 = −1.39189e−019
A14 = 1.45831e−023
A16 = −3.70179e−027
A3 = 1.48240e−008
A5 = 2.30878e−009
A7 = 1.81659e−012
A9 = −2.39785e−015
A11 = 2.10561e−018
A13 = 1.20846e−021
A15 = 3.43940e−026

31th surface

K = −3.11813e+000
A4 = −3.88068e−007
A6 = −1.19018e−010
A8 = −4.23032e−013
A10 = −3.17181e−016
A12 = −2.58822e−019
A14 = 2.86962e−022
A16 = −3.93678e−026
A3 = 3.18532e−007
A5 = 5.35389e−009
A7 = 1.56885e−012
A9 = 1.95280e−014
A11 = 9.95417e−018
A13 = −7.08697e−021
A15 = −3.08479e−025

Various data
Zoom ratio 116.00

| | Wide angle | Middle | Telephoto |
|---|---|---|---|
| Focal length | 8.80 | 100.00 | 1020.80 |
| F-number | 1.75 | 1.75 | 5.30 |
| Half angle of view (deg) | 32.01 | 3.15 | 0.31 |
| Total lens length | 681.25 | 681.25 | 681.25 |
| d14 | 3.87 | 150.98 | 188.46 |
| d16 | 10.21 | 10.05 | 10.03 |
| d21 | 284.02 | 100.73 | 2.00 |
| d23 | 8.00 | 9.60 | 8.27 |
| d32 | 2.99 | 37.74 | 100.33 |
| Entrance pupil position | 140.13 | 1085.30 | 13261.31 |
| Exit pupil position | 182.18 | 182.18 | 182.18 |
| Front principal point position | 149.39 | 1244.51 | 20452.20 |
| Rear principal point position | 4.49 | −86.71 | −1007.49 |

Zoom lens unit data

| Unit | Start surface | Focal length | Lens structure length | Front principal point position | Rear principal point position |
|---|---|---|---|---|---|
| 1 | 1 | 245.00 | 137.58 | 78.95 | −19.22 |
| 2 | 15 | −24.16 | 26.97 | 3.15 | −15.70 |

-continued

[Unit mm]

| | | | | | |
|---|---|---|---|---|---|
| 2-1 | 15 | −34.46 | 2.20 | 0.95 | −0.14 |
| 2-2 | 17 | −102.90 | 14.56 | −0.95 | −9.11 |
| 3 | 22 | 73.07 | 64.25 | 18.46 | −30.29 |
| 3-1 | 22 | 166.13 | 9.92 | 2.94 | −2.84 |
| 3-2 | 24 | 111.79 | 46.33 | 12.91 | −19.84 |
| 4 | 33 | 45.45 | 148.26 | 62.69 | 16.84 |

Individual lens data

| Lens | Start surface | Focal length |
|---|---|---|
| 1 | 1 | −390.73 |
| 2 | 3 | 601.51 |
| 3 | 5 | −2140.25 |
| 4 | 7 | 710.69 |
| 5 | 9 | 735.57 |
| 6 | 11 | 912.82 |
| 7 | 13 | 708.68 |
| 8 | 15 | −34.46 |
| 9 | 17 | −37.05 |
| 10 | 18 | 31.41 |
| 11 | 20 | −60.57 |
| 12 | 22 | 166.13 |
| 13 | 24 | 156.02 |
| 14 | 26 | −196.14 |
| 15 | 28 | 158.22 |
| 16 | 29 | −276.12 |
| 17 | 31 | 187.18 |
| 18 | 34 | −42.40 |
| 19 | 36 | 78.51 |
| 20 | 38 | −226.44 |
| 21 | 40 | −72.88 |
| 22 | 41 | 73.04 |
| 23 | 43 | −35.85 |
| 24 | 44 | 44.40 |
| 25 | 46 | 499.85 |
| 26 | 48 | −40.18 |
| 27 | 49 | 53.26 |
| 28 | 51 | 50.35 |
| 29 | 52 | −65.03 |
| 30 | 54 | 63.25 |
| 31 | 56 | 0.00 |
| 32 | 57 | 0.00 |

Numerical Embodiment 3

[Unit mm]

Surface data

| Surface number | r | d | nd | vd | θgF | Focal length |
|---|---|---|---|---|---|---|
| 1 | 370.02646 | 3.00000 | 1.834807 | 42.73 | 0.5648 | −245.460 |
| 2 | 131.86151 | 1.50000 | | | | |
| 3 | 133.46339 | 16.38563 | 1.433870 | 95.10 | 0.5373 | 312.426 |
| 4 | 7187.78298 | 11.17261 | | | | |
| 5 | 202.29537 | 9.36451 | 1.433870 | 95.10 | 0.5373 | 573.593 |
| 6 | 1054.40766 | 0.20000 | | | | |
| 7 | 140.18738 | 13.98146 | 1.433870 | 95.10 | 0.5373 | 330.683 |
| 8 | 5362.33392 | 0.19044 | | | | |
| 9 | 136.38892 | 9.58102 | 1.433870 | 95.10 | 0.5373 | 441.716 |
| 10 | 460.10675 | (variable) | | | | |
| 11 | −246.39748 | 1.50000 | 2.001000 | 29.13 | 0.5997 | −34.929 |
| 12 | 41.25686 | 5.09603 | | | | |
| 13 | −181.73480 | 1.40000 | 1.772499 | 49.60 | 0.5520 | −26.903 |
| 14 | 23.67232 | 4.00000 | 1.959060 | 17.47 | 0.6598 | 117.164 |
| 15 | 27.39621 | (variable) | | | | |
| 16 | 46.55905 | 5.46738 | 1.808095 | 22.76 | 0.6307 | 38.348 |
| 17 | −90.54190 | 4.54180 | | | | |
| 18 | −46.44439 | 1.30000 | 1.800999 | 34.97 | 0.5864 | −63.151 |

-continued

[Unit mm]

| | | | | | | |
|---|---|---|---|---|---|---|
| 19 | −534.31593 | (variable) | | | | |
| 20 | −64.24834 | 1.30000 | 1.719995 | 50.23 | 0.5521 | −42.248 |
| 21 | 58.78556 | 3.96241 | 1.846660 | 23.87 | 0.6205 | 78.264 |
| 22 | 468.76146 | (variable) | | | | |
| 23 | (stop) | 1.00000 | | | | |
| 24 | 923.64595 | 4.91892 | 1.603112 | 60.64 | 0.5415 | 95.929 |
| 25 | −61.85636 | 0.50000 | | | | |
| 26 | 155.97437 | 4.02784 | 1.487490 | 70.23 | 0.5300 | 202.452 |
| 27 | −268.94033 | 0.50000 | | | | |
| 28 | 83.42956 | 7.70939 | 1.496999 | 81.54 | 0.5375 | 66.672 |
| 29 | −53.53663 | 1.30000 | 1.846660 | 23.87 | 0.6205 | −72.099 |
| 30 | −411.57741 | 2.00000 | | | | |
| 31 | 42.85500 | 3.61675 | 1.846660 | 23.78 | 0.6205 | 195.447 |
| 32 | 55.39285 | 1.64325 | | | | |
| 33 | 57.75069 | 2.00000 | 1.772499 | 49.60 | 0.5520 | −175.745 |
| 34 | 39.95983 | 37.00000 | | | | |
| 35 | 52.82333 | 5.43187 | 1.537750 | 74.70 | 0.5392 | 58.704 |
| 36 | −76.23055 | 1.50000 | | | | |
| 37 | 272.63517 | 1.20000 | 1.882997 | 40.76 | 0.5667 | −37.421 |
| 38 | 29.56272 | 4.22056 | 1.540720 | 47.23 | 0.5651 | 62.535 |
| 39 | 215.80524 | 1.00000 | | | | |
| 40 | 57.33409 | 5.35460 | 1.516330 | 64.14 | 0.5353 | 41.775 |
| 41 | −33.67642 | 1.20000 | 1.882997 | 40.76 | 0.5667 | −30.273 |
| 42 | 135.60334 | 1.00331 | | | | |
| 43 | 89.87263 | 2.99909 | 1.717362 | 29.52 | 0.6047 | 65.499 |
| 44 | −98.72910 | 5.28362 | | | | |
| 45 | ∞ | 33.00000 | 1.608590 | 46.44 | 0.5664 | 0.0000 |
| 46 | ∞ | 13.20000 | 1.516800 | 64.17 | 0.5347 | 0.0000 |
| 47 | ∞ | 8.90000 | | | | |
| Image plane | ∞ | | | | | |

Aspheric surface data
11th surface

K = 0.00000e+000
A4 = 4.82854e−006
A6 = −2.01744e−010
A8 = −1.30529e−011
A10 = 2.38031e−014
A12 = −6.84349e−018

Various data
Zoom ratio 46.00

| | Wide angle | Middle | Telephoto |
|---|---|---|---|
| Focal length | 9.50 | 40.00 | 437.00 |
| F-number | 1.95 | 1.92 | 3.90 |
| Half angle of view (deg) | 30.07 | 7.83 | 0.72 |
| Total lens length | 393.90 | 393.90 | 393.90 |
| d10 | 1.50 | 81.22 | 124.08 |
| d15 | 10.12 | 11.86 | 5.85 |
| d19 | 132.15 | 36.30 | 18.14 |
| d22 | 5.68 | 20.07 | 1.38 |
| Entrance pupil position | 80.13 | 405.45 | 2956.84 |
| Exit pupil position | −307.15 | −307.15 | −307.15 |
| Front principal point position | 89.35 | 440.37 | 2789.59 |
| Rear principal point position | −0.60 | −31.08 | −428.11 |

Zoom lens unit data

| Unit | Start surface | Focal length | Lens structure length | Front principal point position | Rear principal point position |
|---|---|---|---|---|---|
| 1 | 1 | 161.33 | 65.38 | 36.16 | −12.10 |
| 2 | 11 | −20.56 | 33.43 | 2.71 | −22.92 |
| 2-1 | 11 | −14.87 | 12.00 | 4.44 | −3.33 |
| 2-2 | 16 | 77.37 | 11.31 | −6.92 | −13.90 |
| 3 | 20 | −91.94 | 5.26 | 0.33 | −2.55 |
| 4 | 23 | 58.47 | 141.61 | 45.04 | −111.07 |

-continued

[Unit mm]

Individual lens data

| Lens | Start surface | Focal length |
|---|---|---|
| 1 | 1 | −245.46 |
| 2 | 3 | 312.43 |
| 3 | 5 | 573.59 |
| 4 | 7 | 330.68 |
| 5 | 9 | 441.72 |
| 6 | 11 | −34.93 |
| 7 | 13 | −26.90 |
| 8 | 14 | 117.16 |
| 9 | 16 | 38.35 |
| 10 | 18 | −63.15 |
| 11 | 20 | −42.25 |
| 12 | 21 | 78.26 |
| 13 | 24 | 95.93 |
| 14 | 26 | 202.45 |
| 15 | 28 | 66.67 |
| 16 | 29 | −72.10 |
| 17 | 31 | 195.45 |
| 18 | 33 | −175.75 |
| 19 | 35 | 58.70 |
| 20 | 37 | −37.42 |
| 21 | 38 | 62.54 |
| 22 | 40 | 41.78 |
| 23 | 41 | −30.27 |
| 24 | 43 | 65.50 |
| 25 | 45 | 0.00 |
| 26 | 46 | 0.00 |

Numerical Embodiment 4

[Unit mm]

Surface data

| Surface number | r | d | nd | vd | θgF | Focal length |
|---|---|---|---|---|---|---|
| 1 | 572.78489 | 3.00000 | 1.806098 | 40.92 | 0.5701 | −265.727 |
| 2 | 156.19081 | 1.07300 | | | | |
| 3 | 157.47493 | 16.68882 | 1.433870 | 95.10 | 0.5373 | 252.807 |
| 4 | −352.73583 | 11.15000 | | | | |
| 5 | 153.93799 | 8.87251 | 1.433870 | 95.10 | 0.5373 | 509.626 |
| 6 | 495.01541 | 0.20000 | | | | |
| 7 | 122.47704 | 9.65614 | 1.433870 | 95.10 | 0.5373 | 405.716 |
| 8 | 390.73473 | 0.20000 | | | | |
| 9 | 151.18223 | 6.79565 | 1.433870 | 95.10 | 0.5373 | 543.384 |
| 10 | 413.82995 | (variable) | | | | |
| 11 | −202.81897 | 1.00000 | 2.050900 | 26.94 | 0.6054 | −30.258 |
| 12 | 38.19919 | 8.44837 | | | | |
| 13 | −38.93581 | 0.90000 | 1.816000 | 46.62 | 0.5568 | −29.095 |
| 14 | 62.28215 | 0.70000 | | | | |
| 15 | 49.53909 | 7.03623 | 1.892860 | 20.36 | 0.6393 | 27.800 |
| 16 | −47.47829 | (variable) | | | | |
| 17 | −49.36320 | 1.10000 | 1.816000 | 46.62 | 0.5568 | −52.864 |
| 18 | 359.91311 | (variable) | | | | |
| 19 | −60.45900 | 1.30000 | 1.717004 | 47.92 | 0.5605 | −47.212 |
| 20 | 78.49067 | 3.83059 | 1.846490 | 23.90 | 0.6217 | 98.890 |
| 21 | 1073.38482 | (variable) | | | | |
| 22 | 486.65054 | 5.87641 | 1.607379 | 56.81 | 0.5483 | 78.341 |
| 23 | −52.74248 | 0.15000 | | | | |
| 24 | −944.01984 | 3.51644 | 1.518229 | 58.90 | 0.5457 | 299.738 |
| 25 | −134.01898 | (variable) | | | | |
| 26 | (stop) | 1.00000 | | | | |
| 27 | 39.06865 | 9.43204 | 1.487490 | 70.23 | 0.5300 | 58.436 |
| 28 | −98.06367 | 1.50000 | 1.834000 | 37.17 | 0.5774 | −121.818 |
| 29 | −2415.03003 | 0.15000 | | | | |
| 30 | 36.73108 | 8.30910 | 1.487490 | 70.23 | 0.5300 | 53.864 |
| 31 | −86.27365 | 1.50000 | 1.882997 | 40.76 | 0.5667 | −25.097 |
| 32 | 30.30129 | 50.00000 | | | | |
| 33 | −120.62916 | 4.64093 | 1.517417 | 52.43 | 0.5564 | 94.501 |
| 34 | −35.36457 | 2.00000 | | | | |
| 35 | 63.07563 | 1.20000 | 1.785896 | 44.20 | 0.5631 | −82.516 |
| 36 | 31.79036 | 6.49533 | 1.517417 | 52.43 | 0.5564 | 48.172 |
| 37 | −109.65039 | 1.50000 | | | | |
| 38 | 76.16107 | 5.44373 | 1.517417 | 52.43 | 0.5564 | 48.054 |
| 39 | −36.25647 | 1.20000 | 1.834807 | 42.71 | 0.5642 | −24.462 |
| 40 | 48.07162 | 0.66799 | | | | |
| 41 | 33.72522 | 5.00000 | 1.487490 | 70.23 | 0.5300 | 53.766 |
| 42 | −113.62839 | 3.80000 | | | | |
| 43 | ∞ | 33.00000 | 1.608590 | 46.44 | 0.5664 | 0.0000 |
| 44 | ∞ | 13.20000 | 1.516800 | 64.17 | 0.5347 | 0.0000 |
| 45 | ∞ | 12.05000 | | | | |
| Image plane | ∞ | | | | | |

Aspheric surface data

11th surface

K = 0.00000e+000
A4 = 2.24230e−005
A6 = 7.73970e−008
A8 = −1.85376e−010
A10 = 9.40868e−015
A12 = 4.68120e−016
A3 = −8.65610e−007
A5 = −3.83396e−007
A7 = −8.83966e−010
A9 = 8.59974e−013
A11 = −5.25839e−015

12th surface

K = 0.00000e+000
A4 = 1.97724e−005
A6 = −2.79161e−007
A8 = −9.44260e−009
A10 = −1.14469e−011
A12 = 6.32462e−015
A3 = 7.57609e−006
A5 = 7.61624e−007
A7 = 8.34294e−008
A9 = 5.44052e−010
A11 = −1.89925e−013

Various data
Zoom ratio 48.00

| | Wide angle | Middle | Telephoto |
|---|---|---|---|
| Focal length | 9.30 | 35.00 | 446.40 |
| F-number | 2.00 | 2.00 | 4.20 |
| Half angle of view (deg) | 30.60 | 8.93 | 0.71 |
| Total lens length | 382.64 | 382.64 | 382.64 |
| d10 | 1.50 | 69.96 | 117.33 |
| d16 | 3.40 | 3.86 | 5.17 |
| d18 | 110.61 | 20.36 | 3.46 |
| d21 | 10.04 | 30.22 | 1.75 |
| d25 | 3.50 | 4.66 | 1.34 |
| Entrance pupil position | 74.52 | 321.40 | 2469.39 |
| Exit pupil position | 226.74 | 226.74 | 226.74 |
| Front principal point position | 84.23 | 362.10 | 3843.99 |
| Rear principal point position | 2.75 | −22.95 | −434.35 |

Zoom lens unit data

| Unit | Start surface | Focal length | Lens structure length | Front principal point position | Rear principal point position |
|---|---|---|---|---|---|
| 1 | 1 | 154.57 | 57.64 | 30.06 | −12.99 |
| 2 | 11 | −18.58 | 22.42 | 3.51 | −12.39 |
| 2-1 | 11 | −43.94 | 18.08 | −6.28 | −24.58 |

-continued

[Unit mm]

| | | | | | |
|---|---|---|---|---|---|
| 2-2 | 17 | −52.86 | 1.10 | 0.07 | −0.53 |
| 3 | 19 | −90.80 | 5.13 | 0.09 | −2.73 |
| 4 | 22 | 62.64 | 9.54 | 3.98 | −2.18 |
| 5 | 26 | 67.34 | 150.04 | 89.56 | −44.78 |

Individual lens data

| Lens | Start surface | Focal length |
|---|---|---|
| 1 | 1 | −265.73 |
| 2 | 3 | 252.81 |
| 3 | 5 | 509.63 |
| 4 | 7 | 405.72 |
| 5 | 9 | 543.38 |
| 6 | 11 | −30.26 |
| 7 | 13 | −29.09 |
| 8 | 15 | 27.80 |
| 9 | 17 | −52.86 |
| 10 | 19 | −47.21 |
| 11 | 20 | 98.89 |
| 12 | 22 | 78.34 |
| 13 | 24 | 299.74 |
| 14 | 27 | 58.44 |
| 15 | 28 | −121.82 |
| 16 | 30 | 53.86 |
| 17 | 31 | −25.10 |
| 18 | 33 | 94.50 |
| 19 | 35 | −82.52 |
| 20 | 36 | 48.17 |
| 21 | 38 | 48.05 |
| 22 | 39 | −24.46 |
| 23 | 41 | 53.77 |
| 24 | 43 | 0.00 |
| 25 | 44 | 0.00 |

Numerical Embodiment 5

[Unit mm]

Surface data

| Surface number | r | d | nd | vd | θgF | Focal length |
|---|---|---|---|---|---|---|
| 1 | −1769.73128 | 6.00000 | 1.834810 | 42.74 | 0.5648 | −356.484 |
| 2 | 360.70730 | 1.80000 | | | | |
| 3 | 369.83424 | 21.25139 | 1.433870 | 95.10 | 0.5373 | 710.303 |
| 4 | −1844.10909 | 0.20000 | | | | |
| 5 | 796.87239 | 14.54934 | 1.433870 | 95.10 | 0.5373 | 962.655 |
| 6 | −877.45999 | 24.80412 | | | | |
| 7 | 426.98414 | 17.38293 | 1.433870 | 95.10 | 0.5373 | 773.404 |
| 8 | −1566.10718 | 0.25000 | | | | |
| 9 | 263.88248 | 19.53397 | 1.433870 | 95.10 | 0.5373 | 646.078 |
| 10 | 4230.52574 | 1.48244 | | | | |
| 11 | 189.20654 | 15.72153 | 1.438750 | 94.66 | 0.5340 | 760.247 |
| 12 | 424.70686 | (variable) | | | | |
| 13 | −769.11777 | 2.80000 | 2.001000 | 29.13 | 0.5997 | −74.925 |
| 14 | 84.00418 | 4.60000 | | | | |
| 15 | −96.31054 | 1.70000 | 2.001000 | 29.13 | 0.5997 | −30.791 |
| 16 | 46.27765 | 6.07620 | | | | |
| 17 | −95.29052 | 1.72000 | 1.903660 | 31.32 | 0.5946 | −206.034 |
| 18 | −195.33527 | 4.65000 | 1.892860 | 20.36 | 0.6393 | −546.735 |
| 19 | −326.83508 | 0.12000 | | | | |
| 20 | 144.03658 | 9.69000 | 1.892860 | 20.36 | 0.6393 | 34.896 |
| 21 | −39.05626 | 1.70000 | 1.816000 | 46.62 | 0.5568 | −55.196 |
| 22 | −290.11156 | (variable) | | | | |
| 23 | 383.15555 | 10.20000 | 1.496999 | 81.54 | 0.5375 | 193.600 |
| 24 | −127.84521 | (variable) | | | | |
| 25 | 74.25964 | 15.00000 | 1.437000 | 95.10 | 0.5326 | 144.436 |
| 26 | −401.54847 | 0.12000 | | | | |
| 27 | 512.76931 | 5.70000 | 1.437000 | 95.10 | 0.5326 | 449.219 |
| 28 | −318.30160 | 0.12000 | | | | |
| 29 | 81.86998 | 2.02000 | 1.800000 | 29.84 | 0.6017 | −116.612 |
| 30 | 43.28238 | 17.00000 | 1.437000 | 95.10 | 0.5326 | 115.467 |
| 31 | 263.90821 | (variable) | | | | |
| 32 | (stop) | 5.21000 | | | | |
| 33 | −85.48397 | 1.50000 | 1.772499 | 49.60 | 0.5520 | −29.805 |
| 34 | 31.96296 | 0.12000 | | | | |
| 35 | 33.16605 | 3.99000 | 1.805181 | 25.42 | 0.6161 | 43.419 |
| 36 | 522.69489 | 3.03000 | | | | |
| 37 | −38.75963 | 1.50000 | 1.487490 | 70.23 | 0.5300 | −338.356 |
| 38 | −51.25593 | 6.31000 | | | | |
| 39 | −119.76380 | 1.80000 | 1.804000 | 46.58 | 0.5573 | −58.688 |
| 40 | 79.04800 | 4.85000 | 1.805181 | 25.42 | 0.6161 | 129.965 |
| 41 | 305.60641 | 1.68000 | | | | |
| 42 | −52.55966 | 3.50000 | 1.882997 | 40.76 | 0.5667 | −37.443 |
| 43 | 93.37803 | 9.79000 | 1.540720 | 47.23 | 0.5651 | 44.593 |
| 44 | −31.51883 | 0.12000 | | | | |
| 45 | 37.74237 | 14.27000 | 1.834807 | 42.73 | 0.5648 | 205.504 |
| 46 | 39.97623 | 7.92000 | | | | |
| 47 | 1676.58760 | 6.38000 | 1.729157 | 54.68 | 0.5444 | 77.626 |
| 48 | −58.74910 | 0.12000 | | | | |
| 49 | −519.67153 | 5.50000 | 1.953750 | 32.32 | 0.5898 | −30.129 |
| 50 | 30.81220 | 1.21000 | | | | |
| 51 | 34.04910 | 14.88000 | 1.568832 | 56.36 | 0.5489 | 45.951 |
| 52 | −96.38050 | 0.15000 | | | | |
| 53 | 42.88678 | 5.79000 | 1.487490 | 70.23 | 0.5300 | 42.894 |
| 54 | −39.25661 | 3.47000 | 1.953750 | 32.32 | 0.5898 | −140.819 |
| 55 | −57.69934 | 1.25000 | | | | |
| 56 | ∞ | 33.00000 | 1.608590 | 46.44 | 0.5664 | 0.0000 |
| 57 | ∞ | 13.20000 | 1.516330 | 64.15 | 0.5352 | 0.0000 |
| 58 | ∞ | 13.65000 | | | | |
| Image plane | ∞ | | | | | |

Aspheric surface data

13th surface

K = 0.00000e+000
A4 = 1.93552e−006
A6 = 2.71951e−010
A8 = 1.43741e−012
A10 = −9.41523e−015
A12 = 3.66596e−017
A14 = −6.65258e−020
A16 = 4.41119e−023

24th surface

K = 0.00000e+000
A4 = 2.15460e−007
A6 = −2.38101e−010
A8 = 3.90092e−013
A10 = −4.30985e−016
A12 = 3.07209e−019
A14 = −1.24454e−022
A16 = 2.12567e−026

27th surface

K = 0.00000e+000
A4 = −1.29620e−007
A6 = −3.43744e−010
A8 = 5.49813e−013
A10 = −6.65398e−016
A12 = 5.02957e−019
A14 = −2.10978e−022
A16 = 3.72025e−026

Various data
Zoom ratio 110.00

| | Wide angle | Middle | Telephoto |
|---|---|---|---|
| Focal length | 8.00 | 62.16 | 880.00 |
| F-number | 1.75 | 1.75 | 4.80 |
| Half angle of view (deg) | 34.51 | 5.06 | 0.36 |
| Total lens length | 678.85 | 678.85 | 678.85 |

-continued

[Unit mm]

| | | | |
|---|---|---|---|
| d12 | 3.23 | 140.18 | 193.44 |
| d22 | 301.38 | 116.93 | 1.99 |
| d24 | 1.00 | 21.42 | 0.94 |
| d31 | 2.86 | 29.94 | 112.10 |
| Entrance pupil position | 128.03 | 744.69 | 11535.22 |
| Exit pupil position | 186.42 | 186.42 | 186.42 |
| Front principal point position | 136.40 | 829.21 | 16897.00 |
| Rear principal point position | 5.65 | −48.51 | −866.31 |

Zoom lens unit data

| Unit | Start surface | Focal length | Lens structure length | Front principal point position | Rear principal point position |
|---|---|---|---|---|---|
| 1 | 1 | 250.00 | 122.98 | 73.82 | −14.70 |
| 2 | 13 | −26.50 | 33.06 | 1.83 | −22.97 |
| 3 | 23 | 70.98 | 51.16 | 7.44 | −27.32 |
| 3-1 | 23 | 193.60 | 10.20 | 5.14 | −1.71 |
| 3-2 | 25 | 110.00 | 39.96 | 0.85 | −26.02 |
| 4 | 32 | 43.66 | 150.54 | 58.46 | 13.99 |

Individual lens data

| Lens | Start surface | Focal length |
|---|---|---|
| 1 | 1 | −356.48 |
| 2 | 3 | 710.30 |
| 3 | 5 | 962.65 |
| 4 | 7 | 773.40 |
| 5 | 9 | 646.08 |
| 6 | 11 | 760.25 |
| 7 | 13 | −74.92 |
| 8 | 15 | −30.79 |
| 9 | 17 | −206.03 |
| 10 | 18 | −546.73 |
| 11 | 20 | 34.90 |
| 12 | 21 | −55.20 |
| 13 | 23 | 193.60 |
| 14 | 25 | 144.44 |
| 15 | 27 | 449.22 |
| 16 | 29 | −116.61 |
| 17 | 30 | 115.47 |
| 18 | 33 | −29.81 |
| 19 | 35 | 43.42 |
| 20 | 37 | −338.36 |
| 21 | 39 | −58.69 |
| 22 | 40 | 129.96 |
| 23 | 42 | −37.44 |
| 24 | 43 | 44.59 |
| 25 | 45 | 205.50 |
| 26 | 47 | 77.63 |
| 27 | 49 | −30.13 |
| 28 | 51 | 45.95 |
| 29 | 53 | 42.89 |
| 30 | 54 | −140.82 |
| 31 | 56 | 0.00 |
| 32 | 57 | 0.00 |

TABLE 1

| Conditional expression | Embodiment | | | | |
|---|---|---|---|---|---|
| | 1 | 2 | 3 | 4 | 5 |
| (1) m31/m32 | 1.004 | 1.003 | 1.000 | 1.000 | 0.999 |
| (2) m21/m22 | 1.000 | 1.001 | 1.036 | 0.985 | 1.000 |
| (3) f1/f2 | −10.45 | −10.14 | — | — | −9.434 |
| (4) f21/f2 | 1.458 | 1.426 | — | — | 2.827 |
| (5) f21/r2 | −0.921 | −0.855 | — | — | −0.874 |
| (6) β2t/β2w | 19.19 | 19.48 | — | — | 15.02 |
| (7) f31/f32 | 1.198 | 1.486 | — | — | 1.760 |
| (8) f1/f2 | — | — | −7.847 | −8.309 | — |
| (9) f21/f2 | — | — | 1.699 | 1.626 | — |
| (10) f21/r2 | — | — | −0.847 | −0.792 | — |
| (11) β2t/β2w | — | — | 53.42 | 63.36 | — |
| (12) f31/f32 | — | — | — | −1.450 | — |
| (13) (r1 + r2)/(r1 − r2) | 0.867 | 0.737 | 0.714 | 0.686 | — |
| (14) N21 | 2.0033 | 2.0033 | 2.0010 | 2.0509 | 2.0010 |
| (15) ν21 | 28.27 | 28.27 | 29.13 | 26.94 | 29.13 |
| (16) N2p | 1.8929 | 1.8929 | 1.9591 | 1.8929 | 1.8929 |
| (17) ν2p | 20.36 | 20.36 | 17.47 | 20.36 | 20.36 |
| (18) ft/fw | 120 | 116 | 46 | 48 | 110 |
| (19) 2ωw | 65.82 | 64.02 | 60.14 | 61.20 | 69.02 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-034961, filed Feb. 28, 2018, which is hereby incorporated by reference herein in its entirety.

What is claimed is:

1. A zoom lens comprising in order from an object side to an image side:

a first lens unit having a positive refractive power and configured not to be moved for zooming;

a second lens unit having a negative refractive power and configured to be moved for zooming; and a third lens unit having a positive refractive power and configured to be moved for zooming, the third lens unit consisting, in order from the object side to the image side, of a 3-1 sub-lens unit and a 3-2 sub-lens unit, a distance between the 3-1 sub-lens unit and the 3-2 sub-lens unit being changed in zooming, wherein the second lens unit includes a negative lens closest to the object side, and conditional expressions $$-18.0 < f1/f2 < -3.0,$$

$$0.2 < f21/f2 < 3.6,$$

$$-0.95 < f21/r2 < -0.25,$$

$$7.0 < \beta2t/\beta2w < 125.0, \text{ and}$$

$$0.3 < f31/f32 < 2.5$$

are satisfied where f1 is a focal length of the first lens unit, f2 is a focal length of the second lens unit, f21 is a focal length of the negative lens, r2 is a radius of curvature of an image-side surface of the negative lens, β2w is a lateral magnification of the second lens unit at a wide angle end, β2t is a lateral magnification of the second lens unit at a telephoto end, f31 is a focal length of the 3-1 sub-lens unit, and f32 is a focal length of the 3-2 sub-lens unit.

2. The zoom lens according to claim 1, wherein a conditional expression $$0.90 < m31/m32 < 1.12$$

is satisfied where m31 is an amount by which the 3-1 sub-lens unit moves for zooming from the wide angle end to the telephoto end, and m32 is an amount by which the 3-2 sub-lens unit moves for zooming from the wide angle end to the telephoto end.

3. The zoom lens according to claim 1, wherein
the second lens unit consists, in order from the object side to the image side, of a 2-1 sub-lens unit and a 2-2 sub-lens unit, a distance between the 2-1 sub-lens unit and the 2-2 sub-lens unit being changed in zooming, and
a conditional expression $$0.90 < m21/m22 < 1.12,$$

is satisfied where m21 is an amount by which the 2-1 sub-lens unit moves for zooming from the wide angle end to the telephoto end, and m22 is an amount by which the 2-2 sub-lens unit moves for zooming from the wide angle end to the telephoto end.

4. The zoom lens according to claim 1, wherein
a conditional expression $$0.4 < (r1+r2)/(r1-r2) < 0.97$$

is satisfied where r1 is a radius of curvature of an object-side surface of the negative lens.

5. The zoom lens according to claim 1, wherein
a conditional expression $$1.75 < N21 < 2.30$$

is satisfied where N21 is a refractive index of the negative lens.

6. The zoom lens according to claim 1, wherein
a conditional expression $$18 < v21 < 50$$

is satisfied where v21 is an Abbe number of the negative lens.

7. The zoom lens according to claim 1, wherein
the second lens unit includes a positive lens satisfying a conditional expression $$1.7 < N2p < 2.1,$$

where N2p is a refractive index of the positive lens.

8. The zoom lens according to claim 1, wherein
the second lens unit includes a positive lens satisfying a conditional expression $$16 < v2p < 30,$$

where v2p is an Abbe number of the positive lens.

9. The zoom lens according to claim 1, further comprising a lens unit disposed closer to the image side than the third lens unit and configured to be inserted to and removed from an optical path to change a focal length range.

10. A zoom lens comprising in order from an object side to an image side:
a first lens unit having a positive refractive power and configured not to be moved for zooming,
a second lens unit having a negative refractive power and configured to be moved for zooming; and
a third lens unit disposed adjacent to the second lens unit, having a negative refractive power and configured to be moved for zooming, wherein
the second lens unit includes a negative lens closest to the object side, and
conditional expressions $$-18.0 < f1/f2 < -3.0,$$

$$0.2 < f21/f2 < 3.6, \text{ and}$$

$$-3.0 < f21/r2 < -0.25$$

are satisfied where f1 is a focal length of the first lens unit, f2 is a focal length of the second lens unit, f21 is a focal length of the negative lens, and r2 is a radius of curvature of an image-side surface of the negative lens.

11. The zoom lens according to claim 10, wherein
a conditional expression $$7.0 < \beta 2t/\beta 2w < 125.0$$

is satisfied where β2w is a lateral magnification of the second lens unit at a wide angle end, and β2t is a lateral magnification of the second lens unit at a telephoto end.

12. The zoom lens according to claim 10, wherein
the third lens unit consists, in order from the object side to the image side, of a 3-1 sub-lens unit and a 3-2 sub-lens unit, a distance between the 3-1 sub-lens unit and the 3-2 sub-lens unit being changed in zooming, and
a conditional expression $$0.90 < m31/m32 < 1.12$$

is satisfied where m31 is an amount by which the 3-1 sub-lens unit moves for zooming from the wide angle end to the telephoto end, and m32 is an amount by which the 3-2 sub-lens unit moves for zooming from the wide angle end to the telephoto end.

13. The zoom lens according to claim 10, wherein
the third lens unit consists, in order from the object side to the image side, of a 3-1 sub-lens unit and a 3-2 sub-lens unit, a distance between the 3-1 sub-lens unit and the 3-2 sub-lens unit being changed in zooming, and
a conditional expression $$-3.4 < f31/f32 < -0.3$$

is satisfied where f31 is a focal length of the 3-1 sub-lens unit, and f32 is a focal length of the 3-2 sub-lens unit.

14. The zoom lens according to claim 10, wherein
the second lens unit consists, in order from the object side to the image side, of a 2-1 sub-lens unit and a 2-2 sub-lens unit, a distance between the 2-1 sub-lens unit and the 2-2 sub-lens unit being changed in zooming, and
a conditional expression $$0.90 < m21/m22 < 1.12$$

is satisfied where m21 is an amount by which the 2-1 sub-lens unit moves for zooming from the wide angle end to the telephoto end, and m22 is an amount by which the 2-2 sub-lens unit moves for zooming from the wide angle end to the telephoto end.

15. The zoom lens according to claim 10, wherein
a conditional expression $$0.4 < (r1+r2)/(r1-r2) < 0.97,$$

is satisfied where r1 is a radius of curvature of an object-side surface of the negative lens.

16. The zoom lens according to claim 10, wherein
a conditional expression $$1.75 < N21 < 2.30$$

is satisfied where N21 is a refractive index of the negative lens.

17. The zoom lens according to claim 10, wherein
a conditional expression $$18 < v21 < 50,$$

is satisfied where v21 is an Abbe number of the negative lens.

18. The zoom lens according to claim 10, wherein
the second lens unit includes a positive lens satisfying a conditional expression $$1.7 < N2p < 2.1,$$

where N2p is a refractive index of the positive lens.

19. The zoom lens according to claim 10, wherein
the second lens unit includes a positive lens satisfying a conditional expression $$16 < \nu 2p < 30,$$

where ν2p is an Abbe number of the positive lens.

20. The zoom lens according to claim 10, further comprising a lens unit disposed closer to the image side than the third lens unit and configured to be inserted to and removed from an optical path to change a focal length range.

21. An image pickup apparatus comprising:
the zoom lens according to claim 10; and
an image pickup element disposed on an image plane of the zoom lens.

22. The image pickup apparatus according to claim 21, wherein
conditional expressions $$18 < ft/fw < 140, \text{ and}$$

$$57.8 < 2\omega w < 72.6$$

are satisfied where ωw is a half angle of view of the zoom lens at the wide angle end, fw is a focal length of the zoom lens at the wide angle end, and ft is a focal length of the zoom lens at the telephoto end.

23. An image pickup apparatus comprising:
a zoom lens comprising in order from an object side to an image side:
  a first lens unit having a positive refractive power and configured not to be moved for zooming;
  a second lens unit having a negative refractive power and configured to be moved for zooming; and
  a third lens unit having a positive refractive power and configured to be moved for zooming, the third lens unit consisting, in order from the object side to the image side, of a 3-1 sub-lens unit and a 3-2 sub-lens unit, a distance between the 3-1 sub-lens unit and the 3-2 sub-lens unit being changed in zooming, wherein
the second lens unit includes a negative lens closest to the object side, and
conditional expressions $$-18.0 < f1/f2 < -3.0,$$

$$0.2 < f21/f2 < 3.6,$$

$$-0.95 < f21/r2 < -0.25,$$

$$7.0 < \beta 2t/\beta 2w < 125.0, \text{ and}$$

$$0.3 < f31/f32 < 2.5$$

are satisfied where f1 is a focal length of the first lens unit, f2 is a focal length of the second lens unit, f21 is a focal length of the negative lens, r2 is a radius of curvature of an image-side surface of the negative lens, β2w is a lateral magnification of the second lens unit at a wide angle end, β2t is a lateral magnification of the second lens unit at a telephoto end, f31 is a focal length of the 3-1 sub-lens unit, and f32 is a focal length of the 3-2 sub-lens unit; and
an image pickup element disposed on an image plane of the zoom lens.

24. The image pickup apparatus according to claim 23, wherein
conditional expressions $$18 < ft/fw < 140, \text{ and}$$

$$57.8 < 2\omega w < 72.6$$

are satisfied where ωw is a half angle of view of the zoom lens at the wide angle end, fw is a focal length of the zoom lens at the wide angle end, and ft is a focal length of the zoom lens at the telephoto end.

* * * * *